US012806995B2

(12) United States Patent
Jeon et al.

(10) Patent No.: US 12,806,995 B2
(45) Date of Patent: Nov. 24, 2026

(54) VEHICLE DISPLAY APPARATUS

(71) Applicant: LG ELECTRONICS INC., Seoul (KR)

(72) Inventors: Byunglok Jeon, Seoul (KR); Hansoo Kim, Seoul (KR); Sanghyeun Son, Seoul (KR); Inkoo Shim, Seoul (KR); Jinhee Kim, Seoul (KR); Byungkyu Kim, Seoul (KR); Sewon Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/473,556

(22) PCT Filed: Jul. 26, 2024

(86) PCT No.: PCT/KR2024/010899
§ 371 (c)(1),
(2) Date: Oct. 8, 2025

(87) PCT Pub. No.: WO2025/127298
PCT Pub. Date: Jun. 19, 2025

(65) Prior Publication Data

US 2026/0116184 A1 Apr. 30, 2026

(30) Foreign Application Priority Data

Dec. 12, 2023 (KR) ........................ 10-2023-0179219

(51) Int. Cl.
*B60K 35/22* (2024.01)
*B60K 35/29* (2024.01)
(Continued)

(52) U.S. Cl.
CPC .............. *B60K 35/22* (2024.01); *B60K 35/29* (2024.01); *B60K 35/53* (2024.01); *B60K 35/55* (2024.01);
(Continued)

(58) Field of Classification Search
CPC ...... B60K 2360/1526; B60K 2360/162; B60K 2360/164; B60K 2360/166;
(Continued)

(56) References Cited

U.S. PATENT DOCUMENTS 8,587,546 B1 * 11/2013 El-Khoury ............. B60K 35/10 345/173
10,509,613 B2 12/2019 Soh et al.
(Continued)

FOREIGN PATENT DOCUMENTS

CN 111319567 B 6/2023
DE 10 2021 121 077 B3 12/2022
(Continued)

OTHER PUBLICATIONS

International Search Report, issued in PCT/KR2024/010899, PCT/ISA/210, dated Nov. 4, 2024.
(Continued)

*Primary Examiner* — Nitin Patel
*Assistant Examiner* — Amen W Bogale
(74) *Attorney, Agent, or Firm* — Birch, Stewart, Kolasch & Birch, LLP

(57) ABSTRACT

A vehicle display device according to an embodiment of the present invention includes: a first display unit; and a second display unit formed to be moved between the driver seat and the front passenger seat in the vehicle along the horizontal direction of the frame through the operation of a drive module, and configured to, according to the movement thereof, perform screen control for the first display unit. In
(Continued)

addition, the vehicle display device includes a control unit which controls the operations of the first and second display units and the drive module. The control unit performs control to display a first screen on the first display unit, and on the basis that the second display unit is moved to a position corresponding to the front passenger seat, allocate a second screen for the front passenger seat on a part of the first display unit.

15 Claims, 19 Drawing Sheets

(51) Int. Cl.

| | |
|---|---|
| ***B60K 35/53*** | (2024.01) |
| ***B60K 35/55*** | (2024.01) |
| ***B60K 35/60*** | (2024.01) |
| ***B60K 35/65*** | (2024.01) |
| ***B60K 35/81*** | (2024.01) |
| ***G07C 5/02*** | (2006.01) |

(52) U.S. Cl.
CPC ............ *B60K 35/60* (2024.01); *B60K 35/654* (2024.01); *B60K 35/656* (2024.01); *B60K 35/81* (2024.01); *G07C 5/02* (2013.01); *B60K 2360/1526* (2024.01); *B60K 2360/164* (2024.01); *B60K 2360/166* (2024.01); *B60K 2360/1876* (2024.01); *B60K 2360/195* (2024.01)

(58) Field of Classification Search
CPC ...... B60K 2360/182; B60K 2360/1876; B60K 2360/195; B60K 2360/774; B60K 35/10; B60K 35/22; B60K 35/223; B60K 35/265; B60K 35/28; B60K 35/29; B60K 35/53; B60K 35/55; B60K 35/60; B60K 35/654; B60K 35/656; B60K 35/80; B60K 35/81; G07C 5/02
See application file for complete search history.

(56) References Cited

U.S. PATENT DOCUMENTS

| | | | | |
|---|---|---|---|---|
| 10,696,162 | B2 * | 6/2020 | Benchikhi .............. | B60K 35/10 |
| 2008/0266389 | A1 * | 10/2008 | DeWind ................. | B60K 35/10 345/636 |
| 2014/0145933 | A1 * | 5/2014 | Chae ...................... | B60K 35/10 345/156 |
| 2017/0322760 | A1 * | 11/2017 | Soh ........................ | B60K 35/10 |
| 2020/0371733 | A1 * | 11/2020 | Rao ........................ | B60K 35/10 |
| 2021/0129672 | A1 * | 5/2021 | Ahn ....................... | B60K 35/10 |
| 2023/0131471 | A1 | 4/2023 | Sobecki et al. | |
| 2024/0365487 | A1 * | 10/2024 | Helot ..................... | B60K 35/10 |
| 2025/0196635 | A1 | 6/2025 | Chen et al. | |

FOREIGN PATENT DOCUMENTS

| | | | |
|---|---|---|---|
| DE | 10 2019 126 105 | B4 | 10/2023 |
| FR | 3 091 840 | A1 | 7/2020 |
| JP | 2021-115974 | A | 8/2021 |
| JP | 2022-70378 | A | 5/2022 |
| KR | 10-1821053 | B1 | 3/2018 |
| KR | 10-2019-0076731 | A | 7/2019 |
| KR | 10-2021-0029543 | A | 3/2021 |
| KR | 10-2021-0083483 | A | 7/2021 |
| KR | 10-2022-0005946 | A | 1/2022 |
| KR | 10-2022-0108639 | A | 8/2022 |

OTHER PUBLICATIONS

Written Opinion of the International Searching Authority, issued in PCT/KR2024/010899, PCT/ISA/237, dated Nov. 4, 2024.

* cited by examiner (a)

(b)

VEHICLE DISPLAY APPARATUS

CROSS REFERENCE TO RELATED APPLICATIONS

This application is the National Phase of PCT/KR2024/010899 filed on Jul. 26, 2024, which claims priority under 35 U.S.C. § 119(a) to Patent Application No. 10-2023-0179219 filed in the Republic of Korea on Dec. 12, 2023, all of which are hereby expressly incorporated by reference into the present application.

TECHNICAL FIELD

The present disclosure relates to a vehicle display apparatus and, more specifically, to a vehicle display apparatus configured such that a display unit is movable in different directions.

BACKGROUND ART

A vehicle is an apparatus configured to move in a desired direction under the control of a user. An automobile represents a typical example of such a vehicle.

Various sensors and electronic devices are provided in the vehicle to enhance the convenience of the vehicle user. Particularly, for the convenience of the user, research on Advanced Driver Assistance Systems (ADAS) has been actively conducted. Furthermore, significant progress has been made in the development of autonomous vehicles.

In addition, as the time users spend in vehicles increases, there is a noticeable trend of perceiving vehicles not only as transportation tools, but also as personalized environments. Accordingly, research is being conducted to provide a more immersive infotainment environment by employing a large-sized display within a vehicle.

There is a need to enable all occupants in the vehicle to selectively and more conveniently use a display, which is installed to enhance user convenience, in response to situational conditions.

DISCLOSURE OF INVENTION

Technical Problem

Objects of the present disclosure are to address the above-mentioned issues and other related issues.

One object of some embodiments of the present disclosure is to provide a vehicle display apparatus capable of moving to enable both a driver and an occupant in a front passenger seat within a vehicle to conveniently and selectively control a screen, and to provide a method of operating the vehicle display apparatus.

Another object of some embodiments of the present disclosure is to provide a vehicle display apparatus capable of moving to enable both a driver and an occupant in a front passenger seat within a vehicle to simply and intuitively control movement thereof without changing their seated posture, and to provide a method of operating the vehicle display apparatus.

A further object of some embodiments of the present disclosure is to provide a vehicle display apparatus capable of controlling a screen on a large-sized display, which operates in conjunction with the vehicle display apparatus, based on movement of the vehicle display apparatus, and to provide a method of operating the vehicle display apparatus.

Another object of some embodiments of the present disclosure is to provide a vehicle display apparatus capable of providing an associated control screen/execution screen based on the position of the vehicle display apparatus, which aligns with the position of an occupant within a vehicle, and to provide a method of operating the vehicle display apparatus.

Solution to Problem

To accomplish these objects, according to a vehicle display apparatus according to an embodiment of the present disclosure is configured such that, in a case where a display moves in different directions in response to operation of a plurality of drive modules, a screen on a large-sized display, which operates in conjunction with a corresponding display, is controlled in a manner that varies based on a movement direction.

According to one aspect of the present disclosure, there is provided a vehicle display apparatus including: a first display unit that is arranged within a frame formed to correspond to a driver's seat and a front passenger seat within a vehicle, and installed in a rectangular shape to correspond to the driver's seat and the front passenger seat; a second display unit that is coupled to one side of the frame, and configured to move between the driver's seat and the front passenger seat along a transverse direction of the frame in response to the operation of a drive module and to perform screen control on a first display unit in response to the movement; and a control unit that controls the respective operations of the first display unit, the second display section, and the drive module. In the vehicle display apparatus, the control unit displays a first screen on the first display unit, and, based on the movement of the second display to a position corresponding to the front passenger seat, controls the first display unit such that a second screen for the front passenger seat is assigned to one portion of the first display unit.

In an embodiment, in the vehicle display apparatus, the second screen may be displayed on one region of the first display unit, which corresponds to the front passenger seat, and the first screen may be displayed on at least one of the remaining regions of the first display unit. The control unit may display a control screen for the second screen on the second display unit based on the assignment of the second screen for the front passenger seat to the first display unit.

In an embodiment, in the vehicle display apparatus, in a state where the control screen for the second screen is displayed on the second display unit, based on an input to the second display unit, the control unit may control the first display unit such that the first screen remains displayed and that only the second screen is changed.

In an embodiment, in the vehicle display apparatus, in a state where the second screen is displayed on the first display unit, based on the movement of the second display unit to a position corresponding to the driver's seat, the control unit may control the first display unit such that the first screen expands to cover the one region and is displayed.

In an embodiment, in the vehicle display apparatus, based on the movement of the second display unit to the position corresponding to the driver's seat and on the expansion of the first screen to cover the one region and the display of the first screen, the control unit may change a screen on the second display unit to a control screen for the expanded first screen.

In an embodiment, in the vehicle display apparatus, the drive module may include: a first drive module that is coupled to the second display unit, and, in response to a control signal from the control unit, operates to move the second display unit along the transverse direction of the frame; and a second drive module that operates to retract or eject at least one portion of the second display unit into or outward from an internal space of the frame. In the vehicle display apparatus, the control unit may display the second screen for the front passenger seat based on the movement of the second display unit to the position corresponding to the front passenger seat in response to the operation of the first drive module.

In an embodiment, in the vehicle display apparatus, in a state where the at least one portion of the second display unit is ejected outward from the internal space of the frame in response to the operation of the second drive module, based on the movement of the second display unit to the position corresponding to the front passenger seat in response to the operation of the first drive module, the control unit may generate the second screen for the front passenger seat and may display a control screen for the second screen on the second display unit.

In an embodiment, in the vehicle display apparatus, in a state where the second display unit is retracted into the internal space of the frame in response to the operation of the second drive module, based on the movement of the second display unit to the position corresponding to the front passenger seat in response to the operation of the first drive module, the control unit may generate the second screen for the front passenger seat and may display visual information for providing guidance for the operation of the second drive module on the second screen such that the second display unit is ejected outward from the frame.

In an embodiment, in the vehicle display apparatus, in a state where the second screen is displayed on the first display unit, based on the movement of the second display unit to a position corresponding to the driver's seat in response to the operation of the first drive module and on the retraction of the at least one portion of the first display unit into the frame in response to the operation of the second module, the control unit may control the first display unit such that the first screen expands to cover a display region of the second screen.

In an embodiment, in the vehicle display apparatus, in a state where the second screen is displayed on the first display unit and where that at least one portion of the second display unit is ejected outward from the frame, based on the movement of the second display unit to a position corresponding to the driver's seat in response to the operation of the first drive module, the control unit may control the first display unit such that the first screen extends to cover a display area of the second screen and may display a control screen for the first screen on the second display unit.

In an embodiment, in the vehicle display apparatus, while the second display unit moves to the position corresponding to the front passenger seat, the control unit may display visual information indicating a movement direction on the second display, and, at a point in time when the second display unit stops at the position corresponding to the front passenger seat, may display a control screen for the second screen on the second display.

In an embodiment, in the vehicle display apparatus, based on the reception of vehicle navigation information and the arrival of the vehicle at the destination thereof, the control unit may control the operation of the drive module such that the second display unit moves to a position corresponding to the driver's seat and may control the first display unit such that the first screen expands to cover a display region of the second screen.

In an embodiment, the vehicle display apparatus may further include a reception unit that receives state information that is obtained by sensing while the vehicle travels. In the vehicle display apparatus, the control unit may restrict the operation of the drive module based on the received state information. When a preset restriction condition is satisfied, the control unit may operate the drive module such that the second display unit returns to a position corresponding to the driver's seat. When a predetermined time elapses after returning to the position, the control unit may expand the first screen to cover a display region of the second screen and may display the first screen.

In an embodiment, in the vehicle display apparatus, based on satisfaction of a restriction cancellation condition preset based on the received state information, the control unit may cancel a restriction on the operation of the drive module and may operate the drive module such that the second display unit returns to a position held prior to the satisfaction of the preset restriction condition. When the second display unit returns to the position corresponding to the front passenger seat, the control unit may display the recently displayed second screen to the first display unit.

In an embodiment, in the vehicle display apparatus, the first screen may be an execution screen of a navigation application, and the second screen may be one of the following: a navigation execution screen, an execution screen of a recently executed application, or an execution of a user-preset application, each of which is different from the first screen.

Advantageous Effects of Invention

With a vehicle display apparatus according to the present disclosure and a method of operating the vehicle display apparatus, a screen on a front-seat large-sized display can change adaptively based on a change in the position of the vehicle display apparatus configured to be movable. Accordingly, both a driver and an occupant in a front passenger seat can independently view and control the screen.

In addition, with the vehicle display apparatus according to the present disclosure and the method of operating the vehicle display apparatus, different screens corresponding to the current position of the vehicle display apparatus can be output, thereby enabling a screen on a large-sized display to be easily controlled without changing the seated posture of the driver or the occupant in the front passenger seat.

Moreover, with the vehicle display apparatus according to the present disclosure and the method of operating the vehicle display apparatus, movement of the vehicle display apparatus can be intuitively controlled by performing a maneuver on a console that operates in conjunction with the vehicle display apparatus, thereby providing a convenient user experience that enables a change in a display mode of the screen on the front-seat large-sized display.

In addition, with the vehicle display apparatus according to the present disclosure and the method of operating the vehicle display apparatus, in a case where a restriction is required based on the traveling state of a vehicle, the vehicle display apparatus can be restored to the initial position and state thereof, and the screen on the front-seat large-sized display adapts accordingly. Therefore, both the convenient use of the display and the safe driving can be simultaneously achieved.

MODE FOR THE INVENTION

Figure 1:
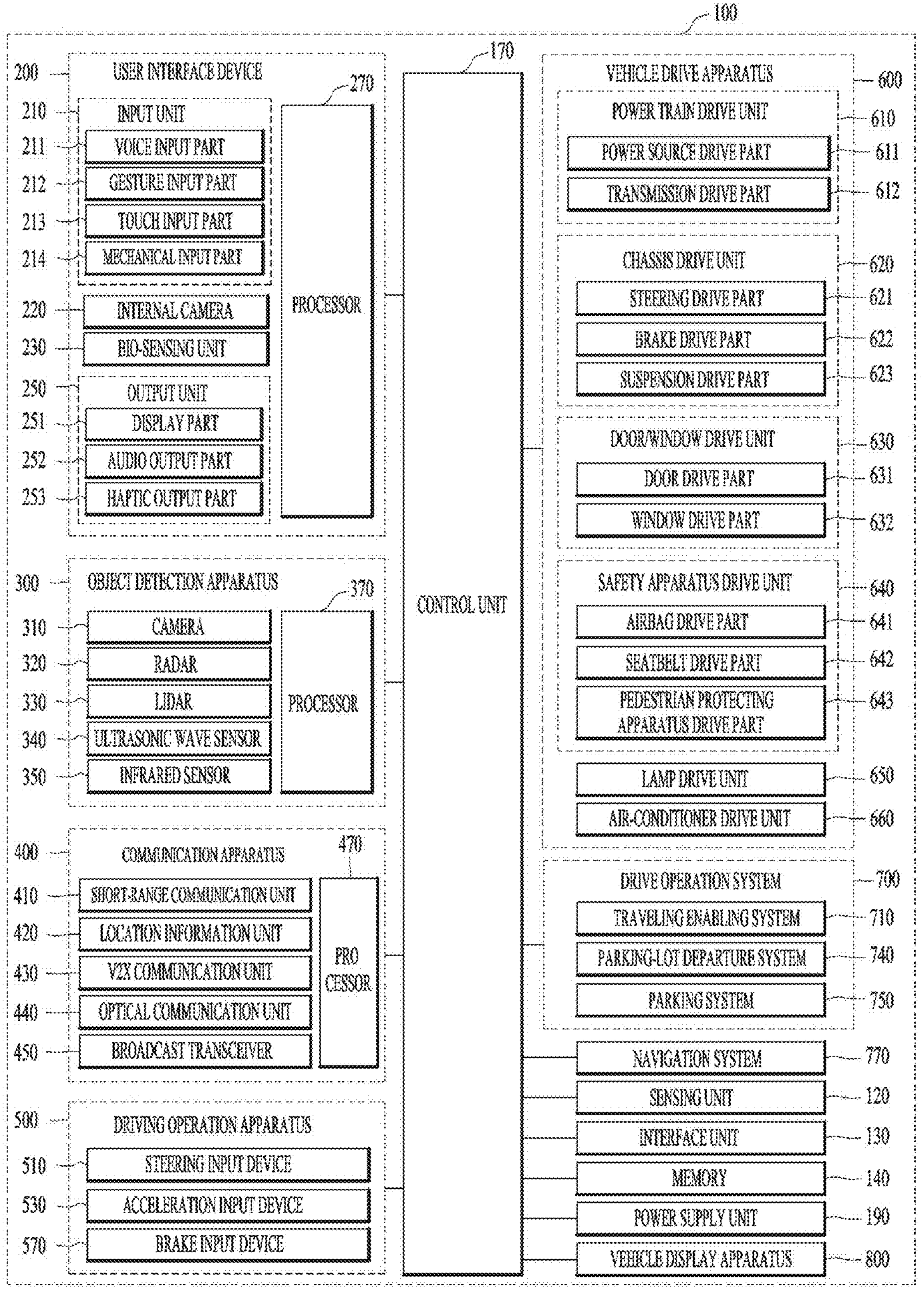
FIG. 1 is a block diagram that is referenced to describe a vehicle display apparatus according to an embodiment of the present disclosure.

FIG. 1 is a block diagram that is referenced to describe a vehicle according to an embodiment of the present disclosure.

With reference to FIG. 1, a vehicle 100 may include wheels that are rotated by a power source and a steering input device 510 for adjusting the direction of travel of the vehicle 100.

The vehicle 100 may be an autonomous vehicle. The vehicle 100 may switch to an autonomous mode or a manual mode on the basis of a user input. For example, the vehicle 100 may switch from the manual mode to the autonomous mode or from the autonomous mode to the manual mode on the basis of a user input received through a user interface device 200 (which may be hereinafter referred to as a 'user terminal').

The vehicle 100 may switch to the autonomous mode or the manual mode on the basis of travel situation information. The travel situation information may be generated on the basis of object information provided by an object detection apparatus 300. For example, the vehicle 100 may switch from the manual mode to the autonomous mode or from the autonomous mode to the manual mode on the basis of the travel situation information generated by the object detection apparatus 300. For example, the vehicle 100 may switch from the manual mode to the autonomous mode or from the autonomous mode to the manual mode on the basis of the travel situation information received through a communication apparatus 400.

The vehicle 100 may switch from the manual mode into the autonomous mode or from the autonomous mode to the manual mode on the basis of information, data, signals, all of which are provided by an external device.

In a case where the vehicle 100 operates to drive in the autonomous mode, the autonomous vehicle 100 may operate to drive using a drive operation system 700. For example, the autonomous vehicle 100 may operate to drive on the basis of information, data, and signals, all of which are generated by a travel enabling system 710, a parking-lot departure system 740, and a parking system 750.

When the vehicle 100 operates to drive in the manual mode, the autonomous vehicle 100 may receive a user input for drive operation, through a driving maneuver apparatus 500. The vehicle 100 may operate to drive on the basis of the user input received through the driving maneuver apparatus 500.

The overall length refers to the length from the front end to the rear end of the vehicle 100, the width refers to the width of the vehicle 100, and the height refers to the length from the bottom of the wheel to the roof. In the following description, an overall-length direction L may refer to a direction which serves as a reference for measuring the overall length of the vehicle 100, a width direction W may refer to a direction that serves as a reference for measuring the width of the vehicle 100, and a height direction H may refer to a direction that serves as a reference for measuring the height of the vehicle 100.

As illustrated in FIG. 1, the vehicle 100 may include the user interface device (which may be hereinafter referred to as the 'user terminal') 200, the object detection apparatus 300, the communication apparatus 400, the driving maneuver apparatus 500, a vehicle drive apparatus 600, the drive operation system 700, a navigation system 770, a sensing unit 120, a vehicular interface unit 130, a memory 140, a control unit 170, and a power supply unit 190.

According to an embodiment, the vehicle 100 may include one or more constituent elements in addition to constituent elements described in the present specification or may omit one or more of the described constituent elements.

The user interface device 200 is a device for communication between the vehicle 100 and a user. The user interface device 200 may receive a user input and may provide information, generated by the vehicle 100, to the user. The vehicle 100 may realize a user interface (UI) or user experience (UX) through the user interface device (which may be hereinafter referred to as the 'user terminal') 200.

The user interface device 200 may include an input unit 210, an internal camera 220, a bio-sensing unit 230, an output unit 250, and a processor 270. According to an embodiment, the user interface device 200 may further include one or more constituent elements in addition to constituent elements described in the present specification or may omit one or more of the described constituent elements.

The input unit 210 is configured to receive information, as input, from the user. Data collected through the input unit 210 may be analyzed by the processor 270 and processed into a control command corresponding to the user's input.

The input unit 210 may be arranged within the vehicle. For example, the input unit 210 may be arranged on one region of the steering wheel, one region of the instrument panel, one region of the seat, one region of each pillar, one region of the door, one region of the center console, one region of the headlining, one region of the sun visor, one region of the windshield, one region of the window, or one region of a similar position.

The input unit 210 may include a voice input part 211, a gesture input part 212, a touch input part 213, and a mechanical input part 214.

The voice input part 211 may convert a user's voice input into an electric signal. The electric signal, resulting from the conversion, may be provided to the processor 270 or the control unit 170. The voice input part 211 may include at least one microphone.

The gesture input part 212 may convert a user's gesture input into an electric signal. The electric signal, resulting from the conversion, may be provided to the processor 270 or the control unit 170.

The gesture input part 212 may include at least one of the following: an infrared sensor or an image sensor, either of which serves to detect the user's gesture input. According to an embodiment, the gesture input part 212 may detect the user's three-dimensional (3D) gesture input. To this end, the gesture input part 212 may include a light output unit that outputs a plurality of infrared rays, or a plurality of image sensors.

The gesture input part 212 may detect the user's 3D gesture input through a Time-of-Flight (TOF) technique, a structured light technique, or a disparity technique.

The touch input part 213 may convert the user's touch input into an electric signal. The electric signal, resulting from the conversion, may be provided to the processor 270 or the control unit 170.

The touch input part 213 may include a touch sensor for detecting the user's touch input. According to an embodiment, the touch input unit 213 may be integrally formed with a display part 251, thereby realizing a touch screen. This touch screen may provide both an input interface and an output interface between the vehicle 100 and the user.

The mechanical input part 214 may include at least one of the following: a button, a dome switch, a jog wheel, or a jog switch. An electric signal generated by the mechanical input part 214 may be provided to the processor 270 or the control unit 170. The mechanical input part 214 may be arranged on the steering wheel, the center fascia, the center console, the cockpit module, the door, and the like.

The internal camera 220 may acquire an image of the interior of the vehicle. The processor 270 may detect a user's state on the basis of the image of the interior of the vehicle. The processor 270 may acquire the user's gaze information from the image of the interior of the vehicle. The processor 270 may detect the user's gesture from the image of the interior of the vehicle.

The bio-sensing unit 230 may acquire the user's bio-information. The bio-sensing unit 230 may include a sensor for acquiring the user's bio-information and may acquire the user's fingerprint information, heart rate information, and the like using the sensor. The bio-information may be used for user authentication.

The output unit 250 may generate an output related to sight, hearing, or touch. The output unit 250 may include at least one of the following: the display part 251, an audio output part 252, or a haptic output part 253.

Graphic objects corresponding to various types of information may be displayed on the display part 251. The display part 251 may include at least one of the following: a liquid crystal display (LCD), a thin-film transistor LCD (TFT-LCD), an organic light-emitting diode (OLED), a flexible display, a three-dimensional (3D) display, an e-ink display, or the like.

The display part 251 may be inter-layered with, or integrally formed with, the touch input part 213, thereby realizing a touch screen.

The display part 251 may be realized as a head-up display (HUD). In a case where the display part 251 may be configured as the HUD, the display part 251 may be equipped with a projection module and thus may output information through an image that is projected onto the window shield or the window.

Examples of the display part 251 may include a transparent display. The transparent display may be attached to the windshield or the window. The transparent display may have a predetermined degree of transparency, and a predetermined screen may be displayed on the transparent display. The transparent display may include at least one of the following: a thin film electroluminescent (TFEL), a transparent organic light-emitting diode (OLED), a transparent a liquid crystal display (LCD), a transmissive transparent display, a transparent light-emitting diode (LED) display, or the like. The transparent display may have adjustable transparency.

The user interface device 200 may include a plurality of display parts, for example, display parts 251*a* to 251*g*.

The display part 251 may be arranged on one region of the steering wheel, one region 521*a*, 251*b*, or 251*e* of the instrument panel, one region 251*d* of the seat, one region 251*f* of each pillar, one region 251*g* of the door, one region of the center console, one region of the headlining, or one region of the sun visor may be realized on one region 251*c* of the windshield, or one region of the window.

The audio output part 252 converts an electric signal provided from the processor 270 or the control unit 170 into an audio signal and outputs the resulting audio signal. To this end, the audio output part 252 may include at least one speaker.

The haptic output part 253 generates a tactile output. For example, the haptic output part 253 may operate to vibrate the steering wheel, the safety belt, and the seats 110FL, 110FR, 110RL, and 110RR, thereby enabling the user to recognize the vibration output.

The processor (hereinafter referred to as a 'control unit') 270 may control the overall operation of each unit of the user interface device 200. According to an embodiment, the user interface device 200 may include a plurality of processors 270 or may also not include any processor 270.

In a case where the processor 270 is not included in the user interface device 200, the user interface device 200 may operate under the control of a processor of another apparatus within the vehicle 100 or under the control of the control unit 170.

The user interface device 200 may be referred to as a vehicle display apparatus. The user interface device 200 may operate under the control of the control unit 170.

The object detection apparatus 300 is an apparatus for detecting an object located outside the vehicle 100. Examples of an object may include a variety of entities related to the drive operation of the vehicle 100. Examples of an object may include lanes, other vehicles, pedestrians, two-wheelers, traffic signals, lights, roads, structures, speed bumps, terrain features, animals, and more.

Road features may include a road surface, a curve, an upward slope, a downward slope, and similar geometric attributes.

A structure may be an object that is located in the vicinity of a road and fixed on the ground. Examples of a structure may include streetlamps, roadside trees, buildings, electric poles, traffic lights, bridges, and similar fixed installations.

Terrain features may include mountains, hills, and similar landforms.

The objects may be classified into moving objects and fixed objects. Examples of moving objects may conceptually include other vehicles and pedestrians. Examples of fixed objects may include traffic signals, roads, and structures.

The object detection apparatus 300 may include a camera 310, a radar 320, a LIDAR 330, an ultrasonic wave sensor 340, an infrared sensor 350, and a processor 370.

According to an embodiment, the object detection apparatus 300 may include one or more constituent elements in addition to constituent elements described in the present specification or may omit one or more of the described constituent elements.

The camera 310 may be positioned on an appropriate portion of the vehicle's exterior to acquire an image of the surroundings of the vehicle. The camera 310 may be a mono camera, a stereo camera 310*a*, an Around View Monitoring (AVM) camera 310*b*, or a 360-degree camera.

For example, the camera 310 may be arranged adjacent to the front windshield within the vehicle to acquire an image of the surroundings ahead of the vehicle. Alternatively, the camera 310 may be arranged in the vicinity of the front bumper or the radiator grill.

For example, the camera 310 may be arranged adjacent to the rear glass pane within the vehicle to acquire an image of the surroundings behind the vehicle. Alternatively, the camera 310 may be arranged adjacent to the rear bumper, the trunk, or the tail gate.

For example, the camera 310 may be arranged adjacent to at least one of the side windows within the vehicle to acquire an image of the surroundings alongside the vehicle. Alternatively, the camera 310 may be arranged in the vicinity of the side mirror, the fender, or the door.

The camera 310 may provide an acquired image to the processor 370.

The radar 320 may include electromagnetic wave transmission and reception units. The radar 320 may be realized in compliance with a pulse radar technique or a continuous wave radar technique in accordance with the principle of emitting an electromagnetic wave. The radar 320 may be realized in compliance with a Frequency Modulated Continuous Wave (FMCW) technique or a Frequency Shift Keying (FSK) technique, each being among continuous wave radar techniques, that varies depending on a signal waveform.

The radar 320 may detect an object using a Time of Flight (TOF) technique or a phase-shift technique, with an electromagnetic wave as a medium, and may detect the location of the detected object, the distance to the detected object, and the relative speed with respect to the detected object.

The radar 320 may be arranged on an appropriate position on the vehicle's exterior to detect an object that is located in front of, behind, or alongside the vehicle.

The LiDAR 330 may include laser transmission and reception units. The LiDAR 330 may be realized using the Time of Flight (TOF) technique or the phase-shift technique.

The LiDAR 330 may be realized as either a drive type or non-drive type.

In a case where the LiDAR 330 is realized as a drive type, the LiDAR 330 may be rotated by a motor and may detect an object in the vicinity of the vehicle 100.

In a case where the LiDAR 330 may be realized as a non-drive type, the LiDAR 330 may detect, through light steering, an object located within a predetermined range from the vehicle 100. The vehicle 100 may include a plurality of non-driven-type LiDARs 330.

The LiDAR 330 may detect an object using the Time of Flight (TOF) technique or the phase-shift technique, with laser light as a medium, and may detect the location of the detected object, the distance to the detected object, and the relative speed with respect to the detected object.

The LiDAR 330 may be arranged on an appropriate position on the vehicle's exterior in order to detect an object located in front of, behind, or on the side of the vehicle.

The ultrasonic wave sensor 340 may include ultrasonic wave transmission and reception units. The ultrasonic wave sensor 340 may detect an object on the basis of an ultrasonic wave and detect the location of the detected object, the distance to the detection object, and the relative speed with respect to the detected object.

The ultrasonic wave sensor 340 may be arranged on an appropriate position on the vehicle's exterior in order to detect an object located in front of, behind, or on the side of the vehicle.

The infrared sensor 350 may include infrared transmission and reception units. The infrared sensor 340 may detect an object on the basis of infrared light, and may detect the location of the detected object, the distance to the detected object, and the relative speed with respect to the detected object.

The infrared sensor 350 may be arranged on an appropriate position on the vehicle's exterior to detect an object located in front of, behind, or alongside the vehicle.

The processor 370 may control the overall operation of each unit of the object detection apparatus 300.

The processor 370 may detect an object on the basis of an acquired image and may track the detected object. The processor 370 may perform operations, such as computing the distance to an object and computing the relative speed with respect to the object, through an image processing algorithm.

The processor 370 may detect an object on the basis of a reflected electromagnetic wave, resulting from an emitted electromagnetic wave being reflected off the object, and may track the detected object. The processor 370 may perform operations, such as computing the distance to an object and computing the relative speed with respect to the object, through an image processing algorithm.

The processor 370 may detect an object on the basis of a reflected electromagnetic wave, resulting from an emitted electromagnetic wave being reflected off the object, and may track the detected object. The processor 370 may perform operations, such as computing the distance to an object and computing the relative speed with respect to the object, on the basis of the reflected electromagnetic wave.

The processor 370 may detect an object on the basis of reflected laser light, resulting from an emitted laser being reflected off the object, and may track the detected object. The processor 370 may perform operations, such as computing the distance to an object and computing the relative speed with respect to the object, on the basis of the reflected laser light.

The processor 370 may detect an object on the basis of a reflected ultrasonic wave, resulting from an emitted ultrasonic wave being reflected off the object, and may track the detected object. The processor 370 may perform operations, such as computing the distance to an object and computing the relative speed with respect to the object, on the basis of the reflected ultrasonic wave.

According to an embodiment, the object detection apparatus 300 may include a plurality of processors 370 or may not include any processor 370. For example, each of the sensors, including the camera 310, the radar 320, the LiDAR 330, the ultrasonic wave sensor 340, and the infrared sensor 350, may individually include its own processor.

In a case where the processor 370 is not included in the object detection apparatus 300, the object detection apparatus 300 may operate under the control of a processor of an apparatus within the vehicle 100 or under the control of the control unit 170.

The object detection apparatus 400 may operate under the control of the control unit 170.

The communication apparatus 400 is an apparatus for performing communication with an external device. The external device here may be another vehicle, a mobile terminal, or a server.

To perform communication, the communication apparatus 400 may include a transmission antenna, a reception antenna, and at least one of the following: a radio frequency (RF) circuit or an RF device, each of which is capable of supporting various communication protocols.

The communication apparatus 400 may include a short-range communication unit 410, a location information unit 420, a V2X communication unit 430, an optical communication unit 440, a broadcast transceiver 450, and a processor 470.

According to an embodiment, the communication apparatus 400 may include one or more constituent elements in addition to constituent elements in the present specification or may omit one or more of the described constituent elements.

The short-range communication unit 410 is a unit for short-range communication. The short-range communication unit 410 may support short-range communication using at least one of the following technologies: Bluetooth™, Radio Frequency IDentification (RFID), Infrared Data Association (IrDA), Ultra-Wide Band (UWB), ZigBee, Near Field Communication (NFC), Wireless-Fidelity (Wi-Fi), Wi-Fi Direct, or Wireless Universal Serial Bus (USB).

The short-range communication unit 410 may form short-range wireless area networks and may perform short-range communication between the vehicle 100 and at least one external device.

The location information unit 420 is a unit for acquiring location information of the vehicle 100. For example, the location information unit 420 may include a Global Positioning System (GPS) module or a Differential Global Positioning System (DGPS) module.

The V2X communication unit 430 is a unit for performing wireless communication with a server (Vehicle to Infrastructure (V2I)), another vehicle (Vehicle to Vehicle (V2V)), or a pedestrian (Vehicle to Pedestrian (V2P)). The V2X communication unit 430 may include an RF circuit capable of supporting protocols for communication with an infrastructure (V2I), communication between vehicles (V2V), and communication with a pedestrian (V2P).

The optical communication unit 440 is a unit for performing communication with an external device, with light as a medium. The optical communication unit 440 may include an optical transmission part that converts an electric signal into an optical signal and transmits the resulting optical signal externally, and an optical reception part that converts a received optical signal back into an electric signal.

According to an embodiment, the optical transmission part may be formed integrally with a lamp included in the vehicle 100.

The broadcast transceiver 450 is a unit for receiving a broadcast signal from an external broadcast management server or transmitting a broadcast signal to the external broadcast management server over a broadcast channel. The broadcast channels may include a satellite channel and a terrestrial channel. The broadcast signals may include a TV broadcast signal, a radio broadcast signal, and a data broadcast signal.

The processor 470 may control the overall operation of each unit of the communication apparatus 400.

According to an embodiment, the communication apparatus 400 may include a plurality of processors 470 or may not include any processor 470.

In a case where the processor 470 is not included in the communication apparatus 400, the communication apparatus 400 may operate under the control of a processor of another device within the vehicle 100 or under the control of the control unit 170.

The communication apparatus 400, together with the user interface device 200, may realize a vehicle display apparatus. In this case, the vehicle display apparatus may be referred to as a telematics device or an Audio Video Navigation (AVN) device.

The communication apparatus 400 may operate under the control of the control unit 170.

The driving maneuver apparatus 500 is an apparatus for receiving the user input for driving.

In the manual mode, the vehicle 100 may operate to drive on the basis of a signal provided by the driving maneuver apparatus 500.

The driving maneuver apparatus 500 may include the steering input device 510, an acceleration input device 530 and a brake input device 570.

The steering input device 510 may receive an input regarding the direction of travel of the vehicle 100 from the user. The steering input device 510 is preferably configured in the form of a wheel, thereby allowing a steering input through the wheel's rotation. According to an embodiment, the steering input device may also be configured in the form of a touch screen, a touchpad, or a button.

The acceleration input device 530 may receive an input for accelerating the vehicle 100 from the user. The brake input device 570 may receive an input for decelerating the vehicle 100 from the user. The acceleration input device 530 and the brake input device 570 are preferably configured in the form of a pedal. According to an embodiment, the acceleration input device or the brake input device may also be configured in the form of a touch screen, a touchpad or a button.

The driving maneuver apparatus 500 may operate under the control of the control unit 170.

The vehicle drive apparatus 600 is an apparatus that electrically controls driving operations of various apparatuses within the vehicle 100.

The vehicle drive apparatus 600 may include a power train drive unit 610, a chassis drive unit 620, a door/window drive unit 630, a safety apparatus drive unit 640, a lamp drive unit 650, and an air-conditioner drive unit 660.

According to an embodiment, the vehicle drive apparatus 600 may include one or more constituent elements in addition to constituent elements in the present specification or may omit one or more of the described constituent elements.

The vehicle drive apparatus 600 may include a processor. Each unit of the vehicle drive apparatus 600 may individually include its own processor.

The power train drive unit 610 may control the operation of a power train apparatus.

The power train drive unit 610 may include a power source drive part 611 and a transmission drive part 612.

The power source drive part 611 may execute control on a power source of the vehicle 100.

For example, in a case where the power source of the vehicle is a fossil fuel-based engine, the power source drive part 610 may execute electronic control on the engine. Accordingly, the output torque and other parameters of the engine may be controlled. The power source drive part 611 may adjust the engine output torque under the control of the control unit 170.

For example, in a case where the power source of the vehicle is an electric energy-based motor, the power source drive part 610 may execute control on the motor. The power source drive part 610 may adjust the rotational speed, torque, and other parameters of the motor under the control of the control unit 170.

The transmission drive part 612 may execute control on the transmission. The transmission drive unit 612 may adjust a state of the transmission. The transmission drive part 612 may change the state of the transmission to Drive (D), Reverse (R), Neutral (N), or Park (P).

In a case where the power source of the vehicle is an engine, the transmission drive part 612 may adjust an engaged state of a gear in Drive (D).

The chassis drive unit 620 may control the operation of the chassis apparatus. The chassis drive unit 620 may include a steering drive part 621, a brake drive part 622, and a suspension drive part 623.

The steering drive part 621 may execute electronic control on a steering apparatus within the vehicle 100. The steering drive part 621 may change the direction of travel of the vehicle.

The brake drive part 622 may execute electronic control on a brake apparatus within the vehicle 100. For example, the brake drive part 622 may reduce the speed of the vehicle 100 by controlling the operation of the brakes provided on the wheels.

The brake drive part 622 may individually control each of the brakes. The brake drive part 622 may control the application of brake forces to a plurality of wheels such that the brake forces differ from one another.

The suspension drive part 623 may execute electronic control on a suspension apparatus within the vehicle 100. For example, in a case where a road surface is uneven, the suspension drive part 623 may reduce the vibration of the vehicle 100 by controlling the suspension apparatus. The suspension drive part 623 may individually control each of the suspensions.

The door/window drive unit 630 may execute electronic control on a door apparatus or a window apparatus within the vehicle 100.

The door/window drive unit 630 may include a door drive part 631 and a window drive part 632.

The door drive part 631 may execute control on the door apparatus. The door drive part 631 may control the opening or closing of a plurality of doors included in the vehicle 100. The door drive part 631 may control the opening or closing of the trunk or the tailgate. The door drive part 631 may control the opening or closing of the sunroof.

The window drive part 632 may execute electronic control on the window apparatus. The window drive part 632 may control the opening or closing of a plurality of windows included in the vehicle 100.

The safety apparatus drive unit 640 may execute electronic control on various safety apparatuses within the vehicle 100.

The safety apparatus drive unit 640 may include an airbag drive part 641, a seatbelt drive part 642, and a pedestrian protection apparatus drive part 643.

The airbag drive part 641 may execute electronic control on an airbag apparatus within the vehicle 100. For example, when a risk is detected, the airbag drive part 641 may control deployment of the airbag.

The seatbelt drive part 642 may execute electronic control on a seatbelt apparatus within the vehicle 100. For example, when a risk is detected, the seatbelt drive part 642 may control seatbelt tightening to secure occupants at seats 110FL, 110FR, 110RL, and 110RR, respectively.

The pedestrian protection apparatus drive part 643 may execute electronic control on the hood lift and the pedestrian airbag. For example, when a collision with a pedestrian is detected, the pedestrian protection apparatus drive part 643 may control deployment of the hood lift and the pedestrian airbag.

The lamp drive part 650 may execute electronic control on various lamp apparatuses within the vehicle 100.

The air-conditioner drive unit 660 may execute electronic control on an air conditioner within the vehicle 100. For example, when the internal temperature of the vehicle is high, the air-conditioner drive unit 660 may control operation of the air conditioner to supply cool air into the interior of the vehicle.

The vehicle drive apparatus 600 may include a processor. Each unit of the vehicle drive apparatus 600 may individually include its own processor.

The vehicle drive apparatus 600 may operate under the control of the control unit 170.

The drive operation system 700 is a system that controls various drive operations of the vehicle 100. The drive operation system 700 may operate in the autonomous mode.

The drive operation system 700 may include the travel enabling system 710, the parking-lot departure system 740, and the parking system 750.

According to an embodiment, the drive operation system 700 may include one or more constituent elements in addition to constituent elements described in the present disclosure or may emit one or more of the described constituent elements.

The drive operation system 700 may include a processor. Each unit of the drive operation system 700 may individually include its own processor.

According to an embodiment, in a case where the drive operation system 700 may be realized in software, the drive operation system 700 may also conceptually operate at a lower level than the control unit 170.

According to an embodiment, the drive operation system 700 may conceptually include at least one of the following: the user interface device 200, the object detection apparatus 300, the communication apparatus 400, the vehicle drive apparatus 600, or the control unit 170.

The travel enabling system 710 may enable the vehicle 100 to travel.

The travel enabling system 710 may be provided with navigation information from the navigation system 770 and provide a control signal to the vehicle drive apparatus 600, thereby enabling the vehicle 100 to travel. The travel enabling system 710 may be provided with object information from the object detection apparatus 300 and provide a control signal to the vehicle drive apparatus 600, thereby enabling the vehicle 100 to travel. The travel enabling system 710 may be provided with a signal from an external device through the communication apparatus 400 and provide a control signal to the vehicle drive apparatus 600, thereby enabling the vehicle 100 to travel.

The parking-lot departure system 740 may enable the vehicle 100 to depart from a parking lot.

The parking-lot departure system 740 may be provided with navigation information from the navigation system 770 and provide a control signal to the vehicle drive apparatus 600, thereby enabling the vehicle 100 to depart from the parking lot. The parking-lot departure system 740 may be provided with object information from the object detection apparatus 300 and provide a control signal to the vehicle drive apparatus 600, thereby enabling the vehicle 100 to depart from the parking lot. The parking-lot departure system 740 may be provided with a signal from an external device through the communication apparatus 400 and provide a control signal to the vehicle drive apparatus 600, thereby enabling the vehicle 100 to depart from the parking lot.

The parking system 750 may enable the vehicle 100 to park at the parking lot.

The parking system 750 may be provided with navigation information from the navigation system 770 and provide a control signal to the vehicle drive apparatus 600, thereby enabling the vehicle 100 to park at the parking lot. The parking system 750 may be provided with object information from the object detection apparatus 300 and provide a control signal to the vehicle drive apparatus 600, thereby enabling the vehicle 100 to park at the parking lot. The parking system 750 may be provided with a signal from an external device through the communication apparatus 400 and provide a control signal to the vehicle drive apparatus 600, thereby enabling the vehicle 100 to park at the parking lot.

The navigation system 770 may provide navigation information. The navigation information may include at least one of the following: map information, information about a preset destination, path information based on the preset destination, information about various objects on a path, lane information, or information about the vehicle's current location.

The navigation system 770 may include a memory and a processor. The navigation information may be stored in the memory. The processor may control the operation of the navigation system 770.

According to an embodiment, the navigation system 770 may update pre-stored information by receiving information from an external device through the communication apparatus 400.

According to an embodiment, the navigation system 770 may also be classified as a sub-constituent of the user interface device 200.

The sensing unit 120 may sense a state of the vehicle. The sensing unit 120 may include posture sensors (e.g., a yaw sensor, a roll sensor, and a pitch sensor), a collision sensor, a wheel sensor, a speed sensor, an inclination sensor, a weight detection sensor, a heading sensor, a gyro sensor, a position module, a vehicle forward/backward movement sensor, a battery sensor, a fuel sensor, a tire sensor, a steering sensor sensing the rotation of a steering wheel, an in-vehicle temperature sensor, an in-vehicle humidity sensor, an ultrasonic sensor, an illumination sensor, an accelerator position sensor, a brake pedal position sensor, and other sensors.

The sensing unit 120 may acquire sensing signals indicating vehicular posture information, vehicular collision information, vehicular direction information, vehicular location information (GPS information), vehicular angle information, vehicular speed information, vehicular acceleration information, vehicular inclination information, vehicular forward/backward movement information, battery information, fuel information, tire information, vehicular lamp information, in-vehicle temperature information, and in-vehicular humidity information. The sensing unit 120 may further acquire sensing signals indicating steering wheel rotation angle, vehicular external illumination, pressure applied to an acceleration pedal, pressure applied to a brake pedal, and the like.

The sensing unit 120 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and other sensors.

The vehicular interface unit 130 may serve as a path to various types of external devices connected to the vehicle 100. For example, the vehicular interface unit 130 may include a port that enables a connection to a mobile terminal and may be connected to the mobile terminal through the port. In this case, the vehicular interface unit 130 may exchange data with the mobile terminal.

The vehicular interface unit 130 may serve as a path for supplying electric energy to the connected mobile terminal. In a case where the mobile terminal is electrically connected to the vehicular interface unit 130, the vehicular interface unit 130 may supply electrical energy, supplied from the power supply unit 190, to the mobile terminal under the control of the control unit 170.

The memory 140 is electrically connected to the control unit 170. Default data for the units, control data for controlling the operations of the units, and data, which are input and output, may be stored in the memory 140. Examples of the memory 140 may include various hardware storage devices, such as a ROM, a RAM, an EPROM, a flash drive, and a hard drive. Programs and the like for processing or control by the control unit 170, and various data for the overall operation of the vehicle 100 may be stored in the memory 140.

According to an embodiment, the memory 140 may be configured to be integrated with the control unit 170 or may be realized as a sub-constituent of the control unit 170.

The control unit 170 may control the overall operation of each unit within the vehicle 100. The control unit 170 may be referred to as an Electronic Control Unit (ECU).

The power supply unit 190 may supply electric power needed to operate each constituent element under the control of the control unit 170. Specifically, the power supply unit 190 may be supplied with electric power from a battery within the vehicle or from other sources.

One or more processors and the control unit 170, which are included in the vehicle 100, may be realized using at least one of the following: application-specific integrated circuits (ASICs), digital signal processors (DSPs), digital signal processing devices (DSPDs), programmable logic devices (PLDs), field-programmable gate arrays (FPGAs), processors, controllers, micro-controllers, microprocessors, or other electronic units for performing similar functions.

In embodiments of the present disclosure, the term 'driver,' 'occupant,' or 'driver or occupant' may refer to one or more individuals riding in a vehicle capable of autonomous traveling according to an embodiment of the present disclosure, such as a driver, passenger, or another occupant.

In addition, in the embodiments of the present disclosure, the term 'vehicle' is used to refer to a vehicle capable of autonomous traveling using artificial intelligence (AI) or a vehicle capable of receiving autonomous driving as a service. In addition, in the embodiments of the present disclosure, the 'vehicle' is capable of freely switching among manual traveling enabled by the driver, fully autonomous traveling, and semi-autonomous traveling.

In the embodiments of the present disclosure, the 'vehicle display apparatus' is a display apparatus arranged in front of a front seat within the vehicle 100 and may be configured to move in different directions.

The vehicle display apparatus may be used to refer to a movable Center Information Display (CID), to include both a movable CID and a Head-Up Display (HUD), or to include a movable CID, a HUD, and a maneuver unit associated with the movement of the CID.

The vehicle display apparatus may be configured such that displays are movable in different directions.

The vehicle display apparatus may include displays for displaying various screens and control a screen displayed on the HUD via a display. In addition, the vehicle display apparatus may be realized such that the CID is movable to control the screen displayed on the HUD.

The vehicle display apparatus may generate a signal for moving the CID in response to a maneuver on the maneuver unit installed at a different position within the vehicle.

The vehicle display apparatus may be activated or deactivated depending on the movement thereof in different directions relative to the front seat within the vehicle and may be used as a flexible controller that a driver in the driver's seat can use or that an occupant in the front passenger seat can control.

In addition, the vehicle display apparatus may operate to switch a screen on the HUD depending on the movement thereof in different directions relative to the front of the vehicle.

Figure 2:
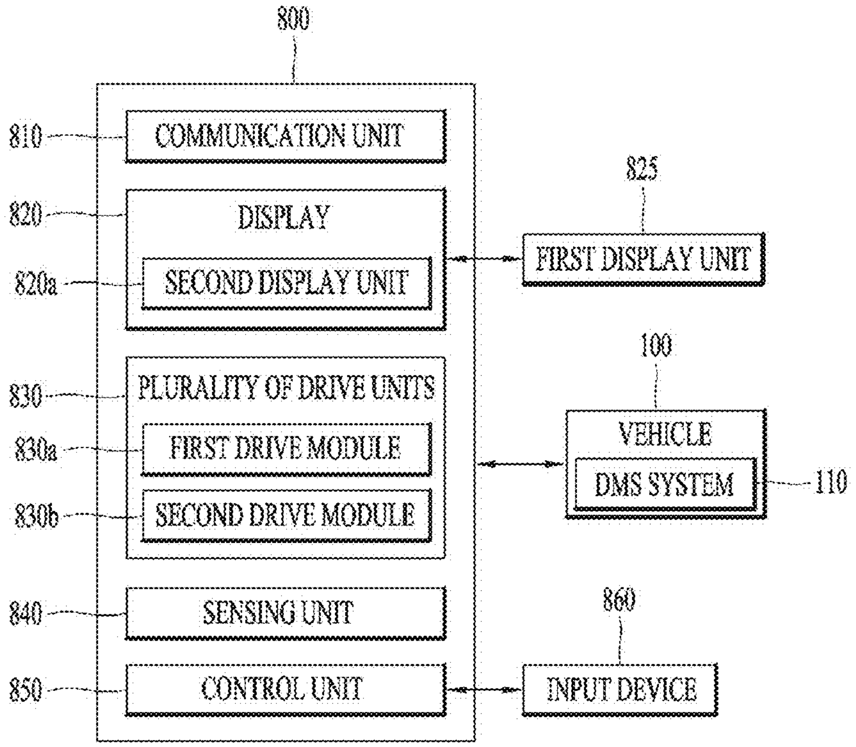
FIG. 2 is a block diagram that is referenced to describe a detailed configuration of the vehicle display apparatus according to the embodiment of the present disclosure, and the operation of an input device that operates in conjunction with the vehicle display apparatus.

FIG. 2 is a block diagram illustrating a vehicle display apparatus 800 according to an embodiment of the present disclosure.

In FIG. 2, the vehicle display apparatus 800 is capable of communicating with sub-constituents of the vehicle 100 and, for example, may be installed in front of the front seat within the vehicle 100.

The vehicle display apparatus 800 in FIG. 2 may include a communication unit 810, a display unit 820, a plurality of drive units 830, a sensing unit 840, and a control unit 850. In addition, the vehicle display apparatus 800 can be understood to include an input device 860 installed at a different position within the vehicle 100. In this case, the vehicle display apparatus 800 may receive a signal generated in response to a maneuver performed on the input device 860 and, based on the received signal, may perform an operation.

The vehicle display apparatus 800 may include a first display 825, which is controlled through an input/maneuver performed on the display unit 820, and a second display 822, which is realized to be movable in different directions to display information associated with a visual image output to the first display 825 or to function as a controller. Alternatively, in one or several embodiments, assuming that the vehicle display apparatus 800 and the first display 825 installed within the vehicle 100 are separate devices, it can be understood that the vehicle display apparatus 800 operates in conjunction with the first display 825.

The first display 825 may also be referred to as a rectangular display mounted on a frame including a cluster in front of the front seat within the vehicle. At this point, the cluster may be integrally displayed on the rectangular display. In addition, the first display 825 can be understood as a constituent included in the vehicle display apparatus 800 or as a constituent separate from the vehicle display apparatus 800.

Unless otherwise specified, the display unit 820 or the display unit 820 of the vehicle display apparatus 800, which is disclosed below, refers to only the second display 822 configured to be movable in different directions. The first display 825, which is formed in an elongated shape along the longitudinal direction and includes the cluster in front of the front seat within the vehicle, is referred to separately when necessary.

In FIG. 2, when the first display (or the rectangular display) is included as a constituent of the vehicle display apparatus 800, a screen output to the first display 825 may be controlled through the display unit 820.

The communication unit 810 may receive sensing values and/or control values from the vehicle 100 and/or various sensors within the vehicle 100, and from various devices/systems such as an Advanced Driver Assistance System (ADAS) and a Driver Monitoring System (DMS).

As an example, the communication unit 810 may receive as the control value a drive signal for operating the plurality of drive units 830, from the input device 860 separately installed within the vehicle 100. As another example, the communication unit 810 may receive as the sensing value a sensing value for operating or limiting the operations of the plurality of drive units 830 in association with safe traveling.

The display unit 820 is configured to display a screen and to be movable in different directions. As described above, the display unit 820 refers to the second display 822.

Specifically, the display unit 820 may move between the driver's seat and the front passenger seat within the vehicle 100 (a first movement direction) or moves to be retracted into the provided frame or to be exposed outward therefrom (a second movement direction). At this point, the movements in the first and second movement directions are performed independently of each other.

The plurality of drive units 830 may include a first drive module 830*a* and a second drive module 830, which operate to enable the display unit 820 of the vehicle display apparatus 800 to move in different directions.

The first drive module 830*a* and the second drive module 830*b* operate independently in response to different drive signals. The first drive module 830*a* and the second drive module 830*b* supply driving forces, respectively, to the display unit 820 to move the display unit 820 in different directions. To this end, the first drive module 830*a* and the second drive module 830*b* each may include a motor.

According to an embodiment, the first drive module 830*a* operates such that the display unit 820 moves in the first direction. According to an embodiment, the second drive module 830*b* operates such that the display unit 820 moves in the second direction different from the first direction.

At this point, the first direction may be a movement direction in which the display unit 820 moves in a transverse direction (left-right direction), and the second direction may be a movement direction in which the display unit 820 moves in a longitudinal direction (up-down direction). Alternatively, the first direction may be a movement direction in which the display unit 820 moves between the driver's seat (or the center) and the front passenger seat within the vehicle, and the second direction may be a movement direction in which the display unit 820 moves to be retracted into an internal space of the frame or to be exposed outward from the internal space.

The first drive module 830*a* may include a drive motor (hereinafter referred to as a 'first drive motor') that enables the display unit 820 to move in the transverse direction (left-right direction). Specifically, the first drive motor is driven by a control signal from the control unit 850, which receives a first drive signal, and moves a moving frame included in the first drive module 830*a* in the transverse direction (left-right direction), thereby enabling the display unit 820 seated on the moving frame to move in the first direction.

The second drive module 830*b* may include a drive motor (hereinafter referred to as a 'second drive motor') that drives the display unit 820 to move in the up-down direction (longitudinal direction). Specifically, the second drive motor is driven by a control signal from the control unit 850, which receives a second drive signal, and moves the moving frame included in the second drive module 830*b* to move in the up-down direction (longitudinal direction), thereby enabling the display unit 820 seated on the moving frame to move in the second direction.

The first drive motor and the second drive motor may be arranged in different directions, respectively, to provide driving forces for moving the display unit 820 in different directions. For example, the first drive motor and the second drive motor may be arranged along directions that are orthogonal to each other.

In addition, at least one of the first or second drive motors is arranged on the same frame as the display unit 820, thereby moving together with the display unit 820 as the frame moves.

The control unit 850 may control the first drive motor to generate rotational forces in different directions, based on detailed direction information included in the first drive signal.

For example, the control unit 850 may control the first drive motor to rotate in a first rotational direction, thereby enabling the display unit 820 to move from the driver's seat (or the center) toward the front passenger seat In addition, for example, the control unit 850 may control the first drive motor to rotate in a second rotational direction, thereby enabling the display unit 820 to move from the front passenger seat toward the driver's seat (or the center).

In addition, the control unit 850 may control the second drive motor to generate rotational forces in different directions, based on detailed direction information included in the second drive signal.

For example, the control unit 850 may control the second drive motor to rotate in the first rotational direction, thereby enabling the display unit 820 to move from the driver's seat (or the center) toward the front passenger seat. In addition, for example, the control unit 850 may control the first drive motor to rotate in the second rotational direction, thereby enabling the display unit 820 to move from the front passenger seat toward the driver's seat (or the center).

In addition, the control unit 850 may generate a control signal for controlling a screen displayed on the first display 825 according to the movement of the display unit 820, and transfer the generated control signal to the second display 822.

The sensing unit 840 may detect an input applied to the vehicle display apparatus 800. In addition, the sensing unit 840 may detect the movement of the display unit 820, which results from operations of the plurality of drive units 830.

The sensing unit 840 may detect the travel distance and relative position of the display unit 820 driven by the first drive module 830*a*. In addition, the sensing unit 840 may detect the travel distance and relative position of the display unit 820 driven by the second drive module 830*b*.

The sensing unit 840 may transfer sensing values, which are obtained by detection resulting from the operations of the plurality of drive units 830, to the control unit 850, thereby enabling the control unit 850 to recognize the travel distance and relative position of the display unit 820.

The sensing unit 840 may detect whether the travel distance and relative position of the display unit 820 have reached a preset threshold distance and threshold position, respectively, and may transfer the results of the detection to the control unit 850.

When the display unit 820 reaches the threshold distance and threshold position, the control unit 850 may recognize that the display unit 820 is no longer able to move in a direction in which the threshold distance and position are exceeded. Accordingly, when the control unit 850 receives a drive signal for the movement in the direction in which the threshold distance and threshold position are exceeded, the control unit 850 may control the display unit 820 to operate in accordance with the movement restriction.

The controller 850 may control the overall operation of the vehicle display apparatus 800. By communicating with the vehicle 100, the control unit 850 may receive sensing information and state information of the vehicle 100 and transmit information about the state and operation of the vehicle display apparatus 800 to the vehicle 100. In addition, by communicating with a DMS system 110 of the vehicle 100, the control unit 850 may receive the result of monitoring the state of the driver/occupant and, based on the received result of monitoring, control the operation of the vehicle display apparatus 800.

The control unit 850 may generate drive signals for operating the plurality of drive units 830 to move the display unit 820. The control unit 850 may generate the first drive signal for operating the first drive module 830*a* such that the display unit 820 moves in the first direction. In addition, the control unit 850 may generate the second drive signal for operating the second drive module 830*b* such that the display unit 820 moves in the second direction different from the first direction.

The controller 850 may control a screen displayed on the display unit 820.

The control unit 850 may control each of the operations of the plurality of drive units 830 based on the first drive and/or the second drive signal that is received through the communication unit 810. Specifically, the control unit 850 controls the operation of the first drive module 830*a* based on the first drive signal, and controls the operation of the second drive module 830*b* based on the second drive signal.

The control unit 850 may control the first drive module 830*a* to operate based on the first drive signal, thereby enabling the display unit 820 to move in the first direction. At this point, the first direction includes detailed direction information. Based on the detailed direction information of the first direction, the control unit 850 controls the operation of the first drive module 830*a* such that the display unit 820 moves from the driver's seat (or the center) within the vehicle 100 to the front passenger seat or from the front passenger seat to the driver's seat (or the center).

In addition, the control unit 850 may control the second drive module 830*a* to operate based on the second drive signal, thereby enabling the display unit 820 to move in the second direction. At this point, the second direction includes detailed direction information. Based on the detailed direction information of the second direction, the control unit 850 controls the operation of the second drive module 830*b* such that the display unit 820 moves to be exposed outward from the internal space of the frame of the vehicle 100 or to be retracted into the internal space thereof.

In addition, the control unit 850 may generate a control signal for controlling a screen displayed on the first display 825 based on the movement of the display unit 820 and provide the generated signal to the first display 825.

The input device 860 may be realized to receive an input generated in response to a user maneuver for moving the display unit 820. The input device 860 may be installed at a different position in the vehicle 100 than the vehicle display apparatus 800.

For example, the input device 860 may be mounted in parallel between the driver's seat and the front passenger seat and may be arranged to be spaced apart in the vertical direction from the vehicle display apparatus 800. In addition, for instance, the input device 860 may be mounted in a position convenient for occupants in the driver's seat and the front passenger seat to operate by hand without requiring a change in their seated posture.

In the present specification, the input device 860 may also be referred to using different terms, including "console," "console display," and "input unit." The input device 860 may be used as an input device that controls the movement of the vehicle display apparatus 800.

In an embodiment, the input device 860 may be configured as a device separate from the vehicle display apparatus 800. In this case, the input device 860 and the vehicle display apparatus 800 may perform wired/wireless communication such that the vehicle display apparatus 800 can move in a direction that varies based on a maneuver performed on the input device 860.

A maneuver may be performed on the input device 860 to match a maneuver technique corresponding to the movement direction of the vehicle display apparatus 800 such that the movement direction is intuitively controlled. For example, a maneuver performed on the input device 860 may be a tilting maneuver that aligns with the direction of moving the vehicle display apparatus 800.

The input device 860 may communicate with the vehicle display apparatus 800 through a communication module (not illustrated). A signal generated by the maneuver performed on the input device 860 may be received by the communication unit 810 of the vehicle display apparatus 800 through the communication module (not illustrated).

Specifically, a signal corresponding to a user maneuver performed through the input device 860 may be converted into a drive signal by the control unit 850 and transferred to the plurality of drive units 830. Various drive modules of the plurality of drive units 830 may operate based on different maneuvers performed on the input device 860.

For example, when a first signal generated in response to a first maneuver performed on the input device 860 is transmitted to the vehicle display apparatus 800, the control unit 850 may transfer the first drive signal corresponding to the received first signal to the first drive module 830*a* and control the display unit 820 to move in the first direction.

At this point, the first maneuver may include information about one of the following: a direction corresponding to the driver's seat (the center) or a direction corresponding to the front passenger seat, with these directions differing from each other. In addition, the first direction may be one of a plurality of directions in which the display unit 820 moves between the driver's seat (the center) and the front passenger seat.

In addition, for example, when a second signal generated in response to a second maneuver performed on the input device 860 is transferred to the vehicle display apparatus 800, the control unit 850 may transfer the second drive signal corresponding to the received second signal to a second drive module 830*a*, thereby controlling the display unit 820 to move in the second direction.

At this point, the second maneuver may include information about one of the following: a direction corresponding to a dashboard of the vehicle or a direction corresponding to a rear seat of the vehicle, with these directions differing from each other. In addition, the second direction may be one of a plurality of directions in which the display unit 820 moves to be retracted into the internal space of the frame into which components of the vehicle display apparatus 800 are built, or to be ejected outward therefrom.

Figure 3:
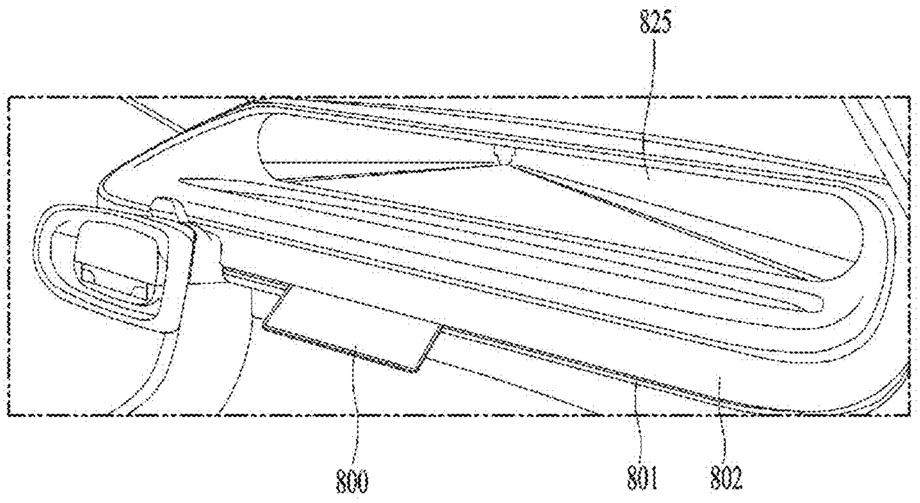
FIG. 3 is a view illustrating that the vehicle display apparatus according to the embodiment of the present disclosure is installed within a vehicle.

FIG. 3 is a view illustrating that the vehicle display apparatus 800 according to an embodiment of the present disclosure is installed within the vehicle 100.

As illustrated in FIG. 3, the vehicle display apparatus 800 (refers to the display unit 820 of the vehicle display apparatus 800) is configured to include the display unit. The display unit is connected to one side of a frame 802 formed to correspond to the driver's seat (or the center) within the vehicle 100 and the front passenger seat and is configured to perform screen control on a rectangular display 825 installed within the frame.

In FIG. 3, a frame 820 is formed to correspond to the cluster and to extend lengthwise from the driver's seat within the vehicle 100 to the front passenger seat. In addition, a rectangular display, that is, the first display 825, is installed in front of the frame 820.

A cabin may be formed within the frame 802, and a slot 801 may be formed to extend lengthwise in the transverse direction along a lower end portion of the frame 802. The vehicle display apparatus 800 may move leftward or rightward along the slot 801 in response to the drive signal. In addition, in response to another drive signal, the vehicle display apparatus 800 may move to be retracted into the slot 801 or to be ejected outward from the slot 801.

At least one constituent of the vehicle display apparatus 800 may be positioned in the internal cabin of the frame 802. For example, a drive module for moving the vehicle display apparatus 800 in different directions and one portion of the frame that includes the drive module may be arranged within the internal cabin of the frame 802. The driving module and the frame may move in different directions within the internal cabin of the frame 802, in response to the movement of the vehicle display apparatus 800 in different directions.

The vehicle display apparatus 800 may include a Center Information Display (CID). In the present specification, the Center Information Display (CID) may be referred to as the display unit 820.

The vehicle display apparatus 800 may be positioned between the driver's seat (or the center) and the front passenger seat and, in response to the drive signal, may be configured to move between the front passenger seat and the driver's seat. Specifically, the vehicle display apparatus 800 may move leftward or rightward along a slot 801 formed on one side of the frame, for example, on a lower end portion of the frame.

In addition, based on another drive signal, the vehicle display apparatus 800 may move to be retracted into the slot 801 of the frame 802 or to be exposed outward from the slot 801 of the frame 802.

Components of the vehicle display apparatus 800, described above with reference to FIG. 2, may be built into the internal space of the frame 802.

For example, drive motors, which constitute the plurality of drive units 830 that provide driving forces to move the vehicle display apparatus 800 in different directions, a fixed/moving frame, and other components may be positioned within the internal space of the frame 802.

Additionally, for example, a control unit, that is, a processor 850, for controlling the movement of the vehicle display apparatus 800 and a screen thereon may be provided within the internal space of the frame 802. Examples of the processor 850 here may include a single System-on-a-Chip (SoC), a Micro Controller Unit (MCU), and equivalents thereof, which include components such as a hypervisor, a CPU, an RT core, an AP core, an NPU, and a GPU. In addition, the processor 850 may operate in conjunction with software for one or more AI learning models.

In an embodiment, the processor 850 may not only control the movement of the vehicle display apparatus 800 and a screen thereon, but may also generate a screen control signal for the rectangular display, that is, the first display 825, in response to the movement and/or maneuver of the vehicle display apparatus 800.

For example, the processor 850 can control a rectangular display 825 such that a screen displayed thereon varies depending on whether the vehicle display apparatus 800 moves to the driver's seat (or the center) or to the position of the front passenger seat.

In an initial state, the vehicle display apparatus 800 may be retracted into the internal cabin of the frame 802 at a position corresponding to the driver's seat (or the center).

In an embodiment, when the vehicle 100 starts on power-up, the vehicle display apparatus 800 may move in a direction in which the vehicle 100 is gradually exposed outward from the slot 801 of the frame 802. Either concurrently with or subsequent to this operation, a screen on the display unit 820 of the vehicle display apparatus 800 may be turned on. At this point, the operation of starting the vehicle 100 on power-up may generate the second drive signal.

While the vehicle 100 is traveling, the vehicle display apparatus 800 may move along the slot 801 in the transverse direction of the frame 802 based on the received first drive signal. In addition, the vehicle display apparatus 800 may move in the longitudinal direction (up and down) to be retracted back into the internal space of the slot 801 based on the received second drive signal.

At this point, the first drive signal and the second drive signal may be generated according to preset input methods, such as voice commands, touch inputs to the display unit 820, or different maneuvers on the input device 860.

In an embodiment, when the vehicle 100 is recognized as being powered off or entering a parking mode, the vehicle display apparatus 800 may return to a preset initial state. For example, when the vehicle display apparatus 800 is in an exposed state outside the slot 801, the vehicle display apparatus 800 may move to be retracted into the internal space of the slot 801. In addition, when the vehicle display apparatus 800 has moved to the front passenger seat, the vehicle display apparatus 800 may move to a position corresponding to the driver's state (or the center). Either concurrently with or subsequent to this operation, a screen on the display unit 820 of the vehicle display apparatus 800 may be turned on. At this point, the operation of starting the vehicle 100 on power-up may generate the first drive signal and/or the second drive signal, depending on the current position of the vehicle display apparatus 800.

Figure 4A:
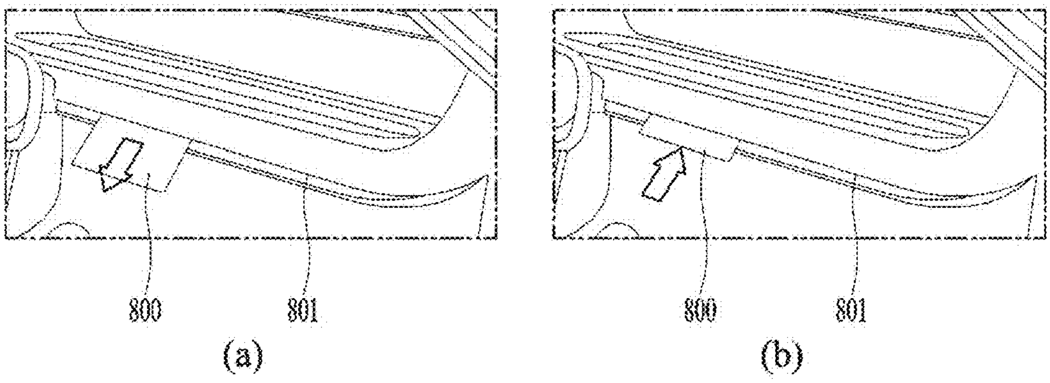
FIGS. 4A and 4B are illustrative views that are referenced to describe movements of the vehicle display apparatus according to the embodiment of the present disclosure in different directions.
Figure 4B:
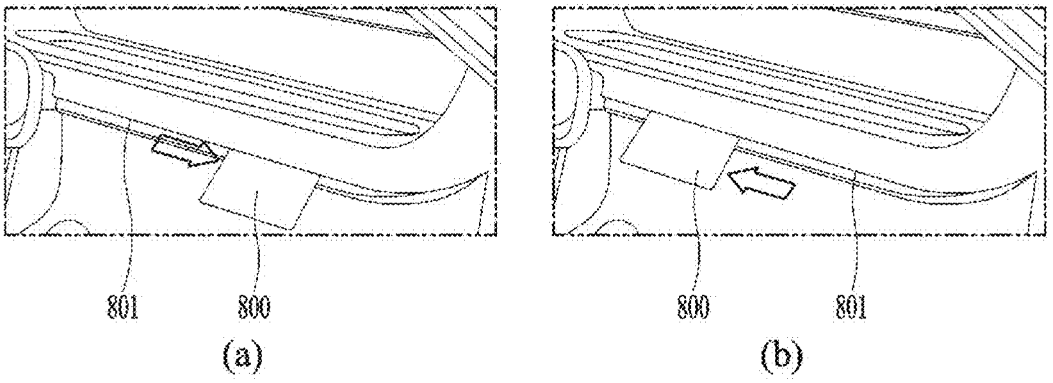

FIGS. 4A and 4B are illustrative views that are referenced to describe the movements of the vehicle display apparatus 800 according to the embodiment of the present disclosure in different directions. At this point, the movement of the vehicle display apparatus 800 in different directions refers to movement of the display unit 820 moves in different directions.

Specifically, FIG. 4A is a view illustrating an example where the vehicle display apparatus 800 moves in a direction in which the vehicle display apparatus 800 is retracted into the internal space of the slot 801 or ejected from the slot 801 (hereinafter referred to the 'second movement direction').

FIG. 4B is a view illustrating an example where the vehicle display apparatus 800 moves along the transverse direction (hereinafter referred to the 'first movement direction) of the slot 801 between the driver's seat (or the center) and the front passenger seat.

First, with reference to FIG. 4B, the first drive module operates in response to the received first drive signal. As a result, the vehicle display apparatus 800 moves along the slot 801 in the first movement direction.

At this point, the first movement direction is defined as a direction in which the vehicle display apparatus 800 moves from the driver's seat (or the center) toward the front passenger seat or from the front passenger seat toward the driver's seat (or the center).

For example, in FIG. 4B, based on the first drive signal, the vehicle display apparatus 800 may move from the center (or the driver's seat) of the vehicle 100 toward the front passenger seat (a). In addition, for example, based on the first drive signal, the vehicle display apparatus 800 may move from the front passenger seat within the vehicle 100 to the center (or the driver's seat) (b).

FIG. 4B illustrates embodiments in which the vehicle display apparatus 800 moves in the first direction in an exposed state from the slot 801. However, the vehicle display apparatus 800 may move in the first direction in a state of being retracted into the slot 801.

In this case, the vehicle display apparatus 800 may move in a state where one portion thereof is exposed outward from the slot 801, such that the vehicle display apparatus 800 is externally recognized as moving in the first direction. Alternatively, while the vehicle display apparatus 800 moves in the first direction in a state of being retracted into the slot 801, LEDs (not illustrated) provided in the vicinity of the slot 801 may be turned on along the movement direction. Alternatively, while the vehicle display apparatus 800 moves in the first direction in a state of being retracted into the slot 801, a sign indicating the movement may be output on a lower end portion of the rectangular display 825 (FIG. 3).

Subsequently, with reference to FIG. 4A, the second drive module operates in response to the received second drive signal. As a result, the vehicle display apparatus 800 moves in the second movement direction.

At this point, the second movement direction is defined as a direction in which the vehicle display apparatus 800 moves to be retracted into the internal space of the slot 801 or to be ejected outward from the slot 801 for exposure.

For example, in FIG. 4A, based on the second drive signal, the vehicle display apparatus 800 may move from the center (or the driver's seat) of the vehicle 100 toward the front passenger seat within the internal space of the slot 801 (*a*). In addition, for example, in FIG. 4, based on the first drive signal, the vehicle display apparatus 800 may move from the front passenger seat within the vehicle 100 toward the center (or the driver's seat) (b).

In an embodiment, in response to the second drive signal, the vehicle display apparatus 800 in FIG. 4A may control the operation of the second drive module such that a retracted state where only a first region of the display unit 820 (FIG. 2) is exposed outward from the slot 801 transitions to an ejected state where an exposure area gradually expands from the first region to a second region, or vice versa.

In response to the second drive signal, one region of the vehicle display apparatus 800 may be exposed outward from the slot 801 or retracted into the slot 801 while being flexibly bent.

When the vehicle display apparatus 800 is exposed outward from the slot 801 in response to the second drive signal, a screen on the vehicle display apparatus 800 may be turned on at a corresponding point in time. Subsequently, when the vehicle display apparatus 800 is retracted into the slot 801 in response to the second drive signal, a screen on the vehicle display apparatus 800 may be turned on at a corresponding point in time.

FIG. 4A illustrates embodiments in which, assuming a position corresponding to the driver's seat (or the center), the vehicle display apparatus 800 is exposed outward from the slot 801 or retracted into the slot 801. However, assuming a position corresponding to the 'front passenger seat,' the vehicle display apparatus 800 may also move in the second movement direction to be exposed outward from the slot 801 or to be retracted into the slot 801.

In an embodiment, the vehicle display apparatus 800 moves independently in the first direction or the second direction.

For example, the vehicle display apparatus 800 may move sequentially in the first movement direction and/or the second movement direction based on the points in time at which the first drive signal and the second drive signal are received. In addition, for example, in a case where the first drive signal and the second drive signal are received simultaneously, the vehicle display apparatus 800 may move in one direction and subsequently in the other direction, according to a preset reference.

In addition, for example, in a case where the first drive signal and the second drive signal are received simultaneously, the vehicle display apparatus 800 may move simultaneously in corresponding directions. For example, in a case where the first drive signal and the second drive signal are received simultaneously, the vehicle display apparatus 800 may perform the operation of being retracted into the slot 801 or ejected therefrom while moving between the driver's seat (or the center) and the front passenger seat.

The vehicle display apparatus 800 is capable of moving in different directions because separate drive modules for moving in different directions are provided.

As illustrated in FIG. 4B, a driving force generated by the first drive motor included in the first drive motor is provided to the first drive module, thereby moving the vehicle display apparatus 800 in the first moving direction. In addition, independently of this movement, a driving force generated by the second drive motor included in the second drive module is provided to the second drive module, thereby moving the vehicle display apparatus 800 in the second direction.

The vehicle display apparatus 800 receives the first drive signal as a control signal for generating a driving force in the first drive motor. In addition, the vehicle display apparatus 800 receives the second drive signal as a control signal for generating a drive force in the second drive motor.

At this point, the first drive signal and the second drive signal may be generated in various ways. For example, a matching drive signal may be generated based on at least one of the following input types: a gesture input, a voice command, a touch input on the display of the vehicle display apparatus 800, a button input, or a maneuver on a maneuver unit 860.

To this end, data about the drive signal matching each input type may be pre-stored in a memory (not illustrated) of the vehicle display apparatus 800.

In an embodiment, when the drive module operates in response to the generated drive signal, the movement direction of the vehicle display apparatus 800 in accordance with the operation of the drive module may be displayed on the display unit of the vehicle display apparatus 800.

For example, while the vehicle display apparatus 800 moves from the driver's seat (or the center) toward the front passenger seat in response to the first drive signal, a sign indicating a corresponding movement direction (e.g., an arrow image indicating the rightward direction) may be output on the display unit 820 (FIG. 2).

In addition, for example, while the vehicle display apparatus 800 is ejected outward from the slot 801 of the frame in response to the second drive signal, a sign indicating a corresponding movement direction (e.g., an arrow image indicating a downward direction) may be displayed on a rectangular display mounted on the frame, that is, on a lower end portion of the first display 825 (FIG. 3).

Figure 5:
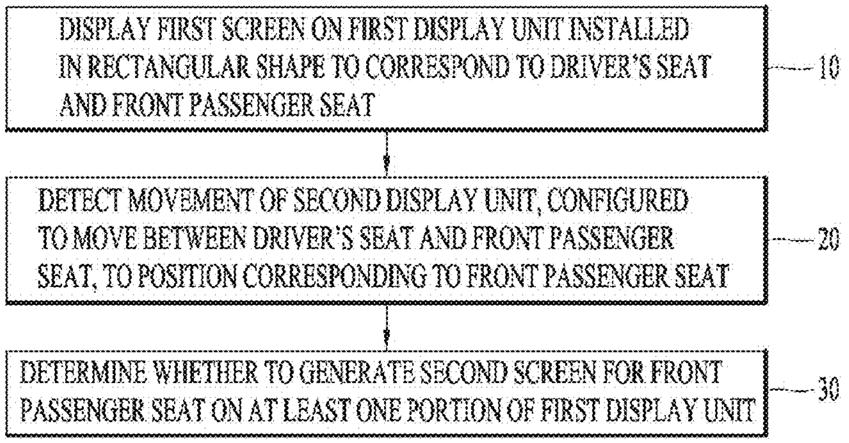
FIG. 5 is a representative flowchart that is referenced to describe a method of controlling a screen in response to the movement of the vehicle display apparatus according to the embodiment of the present disclosure.

FIG. 5 is a representative flowchart that is referenced to describe a method of controlling a screen in response to the movement of the vehicle display apparatus 800 according to the embodiment of the present disclosure. Each operation of the vehicle display apparatus 800 illustrated in FIG. 5 is performed through the control unit 850 (or processor) of the vehicle display apparatus 800, unless otherwise described.

With reference to FIG. 5, the first display 825, which is arranged within the frame formed to correspond to the driver's seat and the front passenger seat within the vehicle 100 and is installed in a rectangular shape to correspond to the driver's seat and the front passenger seat, may be controlled such that a first screen is displayed thereon (10).

In an embodiment, the displaying of the first screen on the first display 825 may be performed by the control unit 170 (FIG. 1) of the vehicle 100 or by the processor 270 (FIG. 1) of the user interface device within the vehicle.

In an embodiment, the first display 825 may be configured to be activated in response to the operation of the vehicle, such as when the vehicle starts on power-up, and to display the first screen after a predetermined time. For example, when the vehicle 100 starts on power-up, the first display 825 and the vehicle display apparatus 800 may be connected to communicate with the vehicle 100, thereby enabling the first display 825 to switch to an activated state. In addition, the vehicle display apparatus 800 may be switched on and appear on the display unit 820.

In addition, in an embodiment, the first screen displayed on the first display 825 may include a navigation execution screen. Specifically, for example, cluster screen/information may be displayed on a region of the first display 825, which corresponds to the left side of the driver's seat, and the navigation execution screen for route guidance may be displayed on the remaining regions. In addition, for example, the navigation execution screen for route guidance may be displayed on the entire first display 825, and cluster information may also be displayed on a region corresponding to the left side of the driver's seat in an overlapping manner.

Subsequently, the vehicle display apparatus 800 may detect that the display unit 820, configured to move between the driver's seat and the front passenger seat, that is, the second display 822, has moved to a position corresponding to the front passenger seat (20).

Specifically, in response to the operation of the first drive module 830*a* based on the first drive signal, the display unit 820 may move in a horizontal direction toward the front passenger seat from a position thereof corresponding to the driver's seat (or the center), which is an initial position thereof. At this point, the display unit 820 may move in the horizontal direction in a state of being retracted into the internal space of the frame 802 (FIG. 3) or may move in the horizontal direction in a state of being ejected outward through the slot 801 formed in the lower end portion of the frame 802.

At this point, the first drive signal may be generated based on the maneuver on the input device 860 that operates in conjunction with the vehicle display apparatus 800. Alternatively, the first drive signal may be generated through a predetermined voice command or gesture input. Alternatively, the first drive signal may also be generated based on a touch input/push input on the display unit 820 included in the vehicle display apparatus 800 or on another maneuver unit.

The control unit 850 of the vehicle display apparatus 800 transfers the first drive signal to the first drive module 830*a*, thereby enabling the first drive module 830*a* to operate. A driving force for moving the display unit 820 in the horizontal direction is transferred by the operation of the first drive module 830*a*.

One sensor of the sensing unit 840 of the vehicle display apparatus 800 may operate in conjunction with a first motor included in the first drive module 830*a*, thereby detecting the travel distance of the display unit 820 and/or a change in the position thereof. The control unit 850 of the vehicle display apparatus 800 may detect the relative position of the display unit 820 based on the sensing value and recognize that the display unit 820, that is, the second display 822, has moved to a position corresponding to the front passenger seat.

Based on this movement of the second display 822 to the position corresponding to the front passenger seat, the vehicle display apparatus 800 may determine whether to generate a second screen for the front passenger seat on at least one portion of the first display 825 on which the first screen is displayed (30).

Specifically, when the second display 822, driven by the first drive module 830*a*, moves to and stops at the position corresponding to the front passenger seat within the vehicle, the vehicle display apparatus 800 may determine that an occupant in the front passenger seat intends to use the first display 825, and assign the second screen for the occupant in the front passenger seat to a region of the first display 825, which corresponds to the front passenger seat.

According to an embodiment, the second screen may be displayed in a manner that is distinguishable from the first screen being displayed on the first display 825. The second screen may be, for example, be one of the following: a navigation screen different, an execution screen of a recently executed application, an execution screen of a user-preset application, or a menu screen for entertainment execution, each of which is different from the first screen.

The vehicle display apparatus 800 may transmit a screen for the occupant in the front passenger seat, that is, the second screen, to a region of the first display 825, which corresponds to the front passenger seat. At this point, the first screen continues to be displayed on the remaining regions of the first display 825.

In an embodiment, screen information that varies depending on whether the second display 822 moving to the position corresponding to the front passenger seat is in a state of being retracted into the internal space of the frame 802 or in a state of being ejected outward through the slot 801 formed on the frame 802, may be displayed on the second screen.

Specifically, based on the movement of the second display 822, that is, the display unit 820, to the position corresponding to the front passenger seat in a state of being retracted into the internal space of the frame 802, guidance information, providing guidance for the ejection of the display unit 820, or preset screen information may be output on a region of the first display 825, which corresponds to the front passenger seat. Based on the movement of the display unit 820 to the position corresponding to the front passenger seat in a state of being exposed outward from the frame 802, the second screen for the occupant in the front passenger seat may be displayed on the region of the first display 825, which corresponds to the front passenger seat.

In this manner, based on a change in the position of the second display 822 resulting from the movement thereof, a screen displayed on the first display 825 that operates in conjunction with the second display 822 may switch from a full-screen mode to a split-screen mode. Accordingly, a service may be provided in which the first display 825 may display the first screen for the driver and the second screen for the occupant in a distinguishable manner on the front passenger seat.

When a screen on the first display 825 that operates in conjunction with the second display 822 switches to the split-screen mode in response to the movement of the second display 822, a screen displayed on the second display 822 also changes.

Figure 6A:
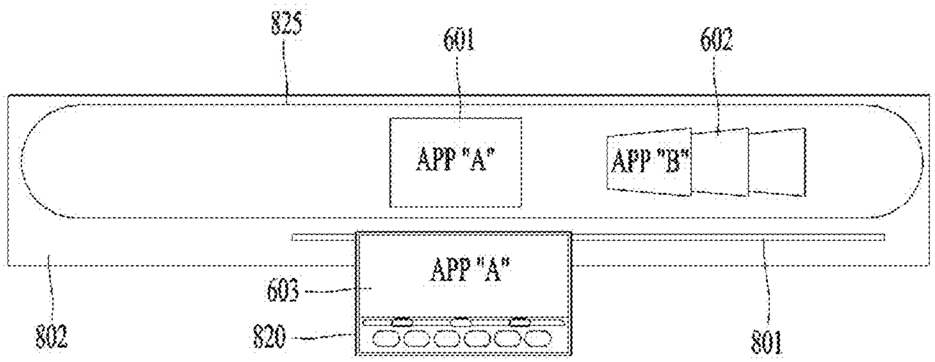
FIGS. 6A and 6B are views illustrating examples in which screens on first and second displays change when the vehicle display apparatus moves in a horizontal direction.
Figure 6B:
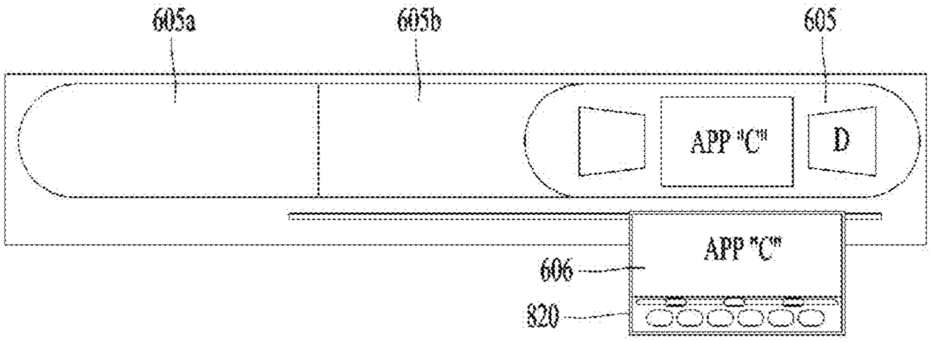

In this regard, FIGS. 6A and 6B are views illustrating examples in which the screens on the first and second displays change when the vehicle display apparatus 800 moves in the horizontal direction.

Figure 7A:
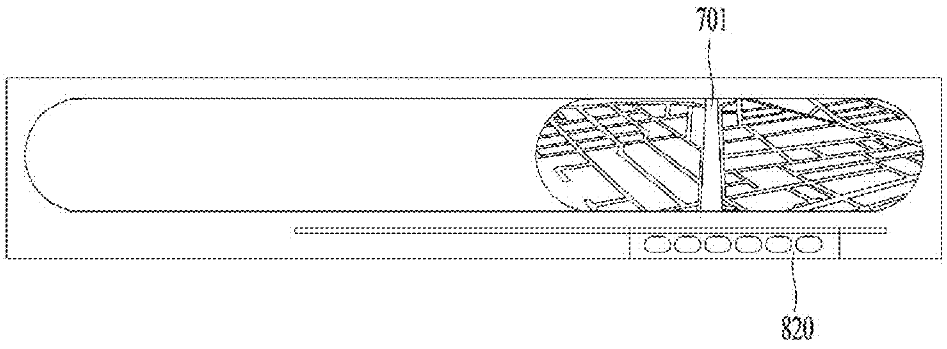
FIGS. 7A to 7C are views illustrating various examples in which a screen is displayed on the first display in a case where the vehicle display apparatus is positioned in the direction of a front passenger seat in a state of being retracted inward.
Figure 7B:
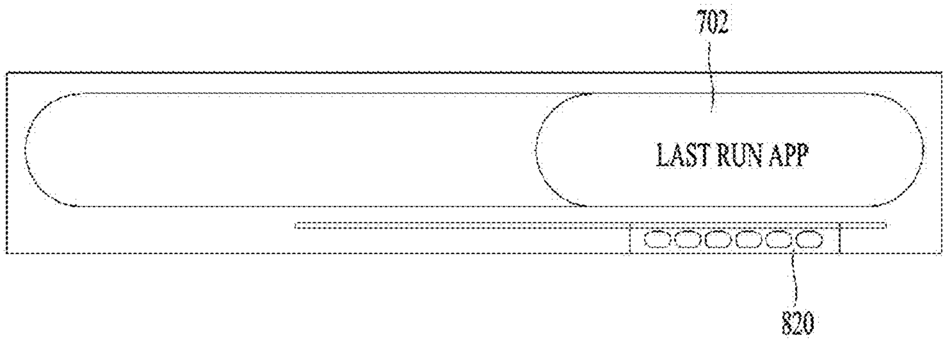
Figure 7C:
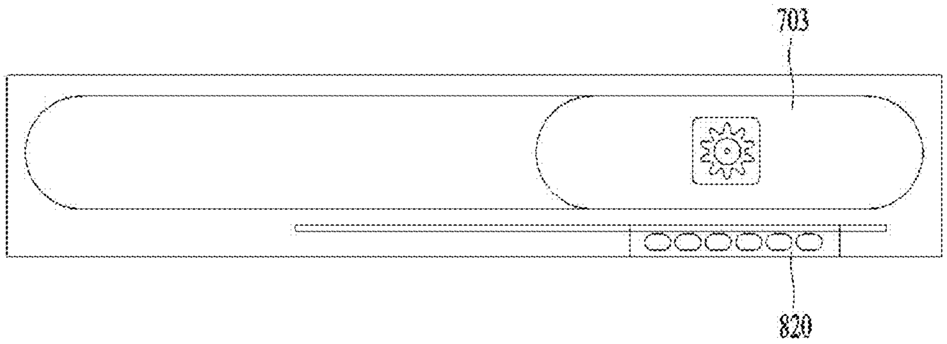

FIGS. 7A to 7C are views illustrating various examples in which a screen is displayed on the first display 825 in a case where the vehicle display apparatus 800 is positioned in the direction of the front passenger seat in a state of being retracted inward.

In an embodiment, in a state where the first screen is displayed on the first display 825, in response to the movement of the second display 822 of the vehicle display apparatus 800 in the horizontal direction, the first screen enters the split-screen mode, thereby generating the second screen for the front passenger seat. At this point, the first screen may be, for example, the navigation execution screen for the driver, and the second screen may be, for example, an entertainment screen for the occupant in the front passenger seat.

When the screen on the first display 825 enters the split-screen mode in this manner, the second screen is displayed on one region of the first display 825, which corresponds to the front passenger seat, and the first screen may be displayed on at least one of the remaining regions of the first display 825.

At this point, the display of the first screen on at least one of the remaining regions of the first display 825 indicates that one or more of the remaining regions of the first display 825, other than the region on which the first screen is displayed, may be assigned as cluster regions for vehicle information or that the vehicle state information is displayed on the first screen in the form of an overlay.

Before the second display 822 of the vehicle display apparatus 800 moves toward the front passenger seat, the second display 822 may be used as a control screen for the first screen for the driver, which is displayed on the first display 825.

In addition, in an embodiment, when in response to the movement of the second display 822 of the vehicle display apparatus 800, the second screen for the front passenger seat is assigned to the first display 825 that operates in conjunction with the second display 822, the vehicle display apparatus 800 may control the moved second display 822 to display a control screen for the second screen on the first display 825.

For example, with reference to FIG. 6A, while the display 820 of the vehicle display apparatus 800, that is, the second display, is positioned at a position corresponding to the driver's seat (or the center), the second display may function as a control screen for the entire first screen displayed on the first display 825.

Specifically, it is assumed that a selection screen in the form of a card for selecting an application screen to be displayed on the first display 825 is provided as the first screen. Furthermore, it is assumed that as illustrated in FIG. 6A, the second display of the vehicle display apparatus 800, that is, the display unit 820, is positioned at the initial position thereof in a manner that corresponds to the driver's seat within the vehicle 100. In this case, a selection screen on the first display 825 may be displayed in the full-screen mode, and the display unit 820 may function as a control screen for a menu screen. This is because it is easier for the driver to control the screen on the first display 825 using the display unit 820.

In the central region of the first display 825, a screen 601 of a currently selected application is displayed, and in the right-side region of the first display 825, that is, at the position corresponding to the front passenger seat, a menu 602 for other changeable applications may be displayed. In this case, a control screen 603 corresponding to the screen 601 of the application, which is displayed in the central region of the first display 825 may be displayed on the display unit 820, that is, the second display 822. At this point, the control screen 603 may be an execution screen for the screen 601 of the application or be one portion thereof.

When a user input is applied to the control screen 603 in this state, the screen on the first display 825 is controlled based on the user input. For example, based on the application of a sliding touch to the control screen 603 from the right side to the left side, an application screen displayed in the central region of the first display 825 may change to APP "B," and the menu in the right-side region may be updated accordingly. Subsequently, the control screen 603 may switch to a control screen/execution screen for APP "B."

Although not illustrated, when the vehicle display apparatus 800 is in a state of being retracted into the internal space of the frame 802 without being exposed through the slot 801, a sign for providing guidance for the outward ejection of the vehicle display apparatus 800 may be output on a lower end portion, at a corresponding position, of the first display 825, or on a lower end portion of the display unit 820.

Subsequently, with reference to FIG. 6B, based on the movement of the vehicle display apparatus 800 to the position corresponding to the front passenger seat within the vehicle 100, the second screen for the occupant in the front passenger seat is assigned to the first display 825. For example, in FIG. 6B, a selection screen 605 for the occupant in the front passenger seat is displayed on the right-side region of the first display 825. In addition, a control screen for the selection screen 605, for example, an execution screen 606 of a current application on the selection screen 605 is displayed on the repositioned second, that is, the display unit 820.

At this point, it should be noted that the display unit 820 of the vehicle display apparatus 800 no longer provide a screen to be output on a first region 605*a* and a second region 605*b*, that is, a control screen for the first screen to be displayed on the first display unit 825. In other words, the display unit 820 provides only a screen to be output on the right-side region of the first display 825, that is, a control screen for the second screen.

At this point, the first region 605*a* may be, for example, a cluster region that includes vehicle state information, and the second region 605*b* may be a navigation screen region that assists the driver in operating the vehicle.

In an embodiment, in a state where the control screen for the second screen is displayed on the display unit 820, that is, the second display, the control unit 850 of the vehicle display apparatus 800 may control the screen on the first display 825 based on the input on the second display, such that the first screen on the first display 825 remains displayed and only the second screen is changed.

For example, in a state where "App C" is displayed as the execution screen 606 of a current application on the display unit 820, that is, the second display, when a sliding touch input from right to left is applied to the display unit 820, the next application screen "D" is output on a region in which the second screen on the first display 825 operating in conjunction with the display unit 820 is output, and a control screen/execution screen for "D" may also be output on the display unit 820. In this case, the screens for the first area 605*a* and the second area 605*b*, which are described above, may be customized independently by the driver.

In this manner, according to the present disclosure, in response to the movement of the vehicle display apparatus 800, a large-sized screen may be used in a distinguishable manner without any interference by the driver and the occupant in the front passenger seat. Thus, the occupant in the front passenger seat is enabled to easily control the screen throughout the moved vehicle display apparatus 800.

As illustrated in FIGS. 7A to 7C, even in a case where the vehicle display apparatus 800 is positioned in the direction of the front passenger seat in a state of being retracted into the frame 802, the second screen for the occupant in the front passenger seat is generated on the first display 825.

At this point, the second screen may be displayed with a background image, a color, and other visual properties that differ from those of the first screen in a region of the first display 825, where the first screen is output, such that the generation of the second screen for the occupant in the front passenger seat on the first display 825 is visually recognized.

In addition, although not illustrated in detail, in a state where the vehicle display apparatus 800 is retracted into the frame, a sign for distinguishing between a case where the vehicle display apparatus 800 is positioned at an initial position thereof, that is, a position thereof corresponding to the driver's seat (or the center), or a case where the vehicle display apparatus 800 has moved toward the front passenger seat may be suitably displayed on the first display 825 or the second display 822.

With reference to FIG. 7A, based on the movement of the vehicle display apparatus 800 toward the front passenger seat, a navigation execution screen 701 dedicated to the occupant in the front passenger seat may be displayed, as the second screen for the occupant in the front passenger seat, on the first display 825. At this point, the navigation execution screen 701 dedicated to the occupant in the front passenger seat may be controlled independently of the navigation execution screen for the driver, which is displayed as the first screen on the first display 825. As another embodiment, detour information selected from the navigation execution screen 701 dedicated to the occupant in the front passenger seat may be displayed, or proposed to be displayed, on the navigation execution screen displayed on the first screen on the first display 825 within a range that avoids interference with the driver's driving.

With reference to FIG. 7B, based on the movement of the vehicle display apparatus 800 toward the front passenger seat, an execution screen 702 of the last application executed on the second screen on the first display 825 may be displayed. For example, for driving safety, the vehicle display apparatus 800 may return to the initial position thereof and then moves back toward the front passenger seat. Based on this movement of the vehicle display apparatus 800, a screen immediately previously output as the second screen on the first display 825 may be displayed again on a region assigned to the occupant in the front passenger seat.

Subsequently, with reference to FIG. 7C, based on the movement of the vehicle display apparatus 800 toward the front passenger seat, a default screen preset as the second screen on the first display 825, for example, a settings screen 703 may be output. At this point, the settings screen 703, initially displayed as the second screen, may be varied in response to a user input/setting.

Figure 8:
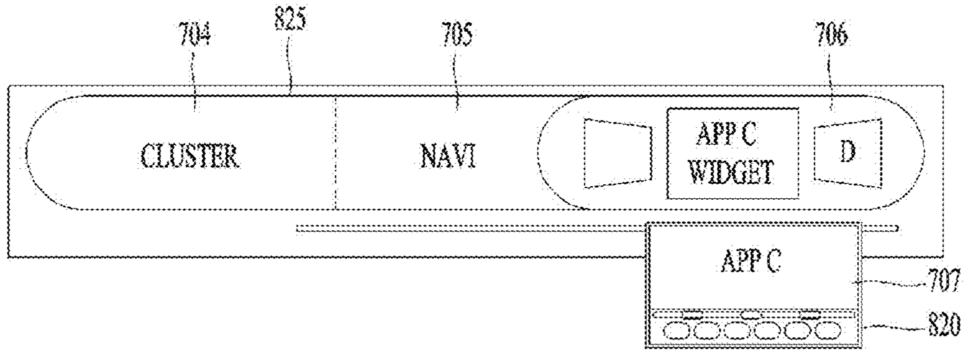
FIG. 8 is an illustrative view illustrating that when the vehicle display apparatus moves from the front passenger seat to the direction of a driver's seat, a split-screen mode of the screen on the first display is integrated back into a full-screen mode.
Figure 8:
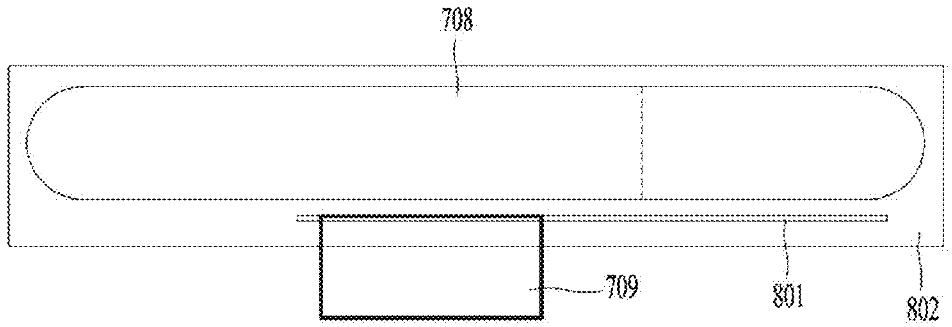

FIG. 8 is a view illustrating that when the vehicle display apparatus 800 moves from the front passenger seat to the direction of the driver's seat, the split-screen mode of the screen on the first display is integrated back into the full-screen mode.

In an embodiment, in a state where the second screen for the occupant in the front passenger seat is displayed on the first display 825, the control unit 850 of the vehicle display apparatus 800 may control the first display 825 to switch from the split-screen mode back to the full-screen mode, based on the movement of the second display of the vehicle display apparatus 800, that is, the display unit 820, to the initial position thereof corresponding to the driver's seat. Accordingly, the first screen on the first display 825 is displayed in such a manner as to expand to cover one region where the second screen is output.

For example, with reference to (a) of FIG. 8, based on the movement of the display unit 820 of the vehicle display apparatus 800 to the position corresponding to the front passenger seat, a screen on the first display 825 switches to the split-screen mode. Accordingly, a first region 704 of the first display 825 serves as a cluster area, the navigation execution screen for the driver is displayed in a second region 705, and a screen for the occupant in the front passenger seat is displayed in a third region 706. A control screen/execution screen 707 for controlling the screen displayed in the third region 706 is output on the moved display unit 820.

In this state, as illustrated in (b) of FIG. 8, when the display unit 820 of the vehicle display apparatus 800 moves from the front passenger seat along the slot 801 in such a manner as to correspond to the driver's seat (the center), the screen on the first display 825 switches from the split-screen mode to the full-screen mode. Accordingly, the third region 702 of the first display 825 is integrated with the second area 705. Accordingly, the first display 825 switches to a screen 708 corresponding to the full-screen mode.

In this case, according to an embodiment, the second display 822, that is, the display unit 820, may move to a position corresponding to the driver's seat, and the first screen on the display 825 may be displayed in such a manner as to expand to cover one region where the second screen is output. Based on the movement of the display unit 820 and the display of the first screen, the control unit 850 of the vehicle display apparatus 800 may change the screen on the second display to a control screen for the expanded first screen.

For example, in (b) of FIG. 8, a change to a control screen 709 for the screen 708 corresponding to the above-described full-screen mode may take place on the second display of the moved vehicle display apparatus 800, that is, the display unit 820.

Subsequently, when no input is received on the control screen 709 of the display unit 820 after a predetermined time elapses, the display unit 820 may operate to be retracted into the inner space of the frame 802 through the slot 801. Even in this case, the driver may directly control the screen on the first display 825 through a touch input on the first display 825.

Figure 9:
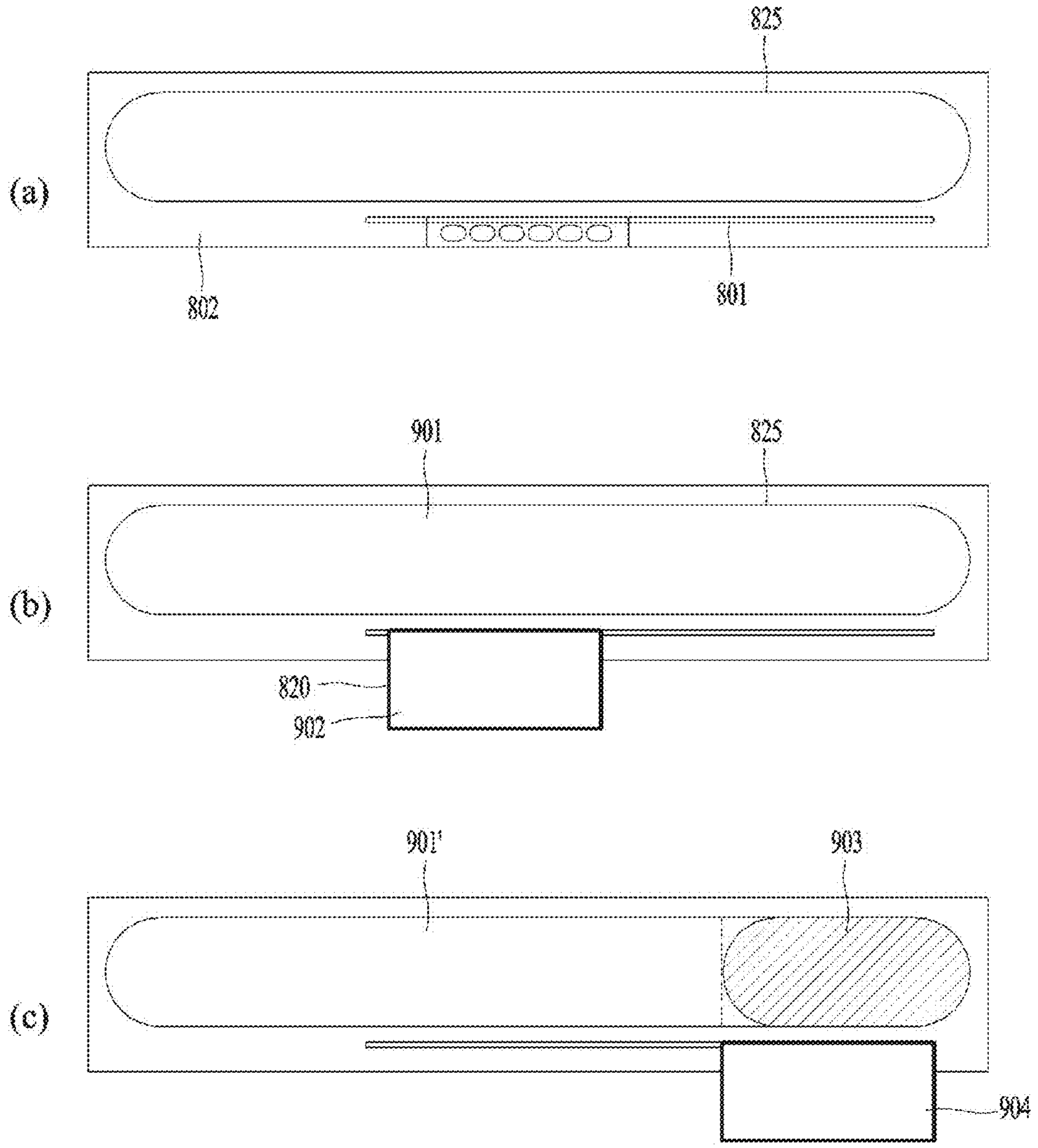
FIG. 9 is an illustrative view that is referenced to sequentially describe a method of controlling a screen on the first display while the vehicle display apparatus, ejected outward, moves in the direction of the front passenger seat.

Subsequently, FIG. 9 is an illustrative view that is referenced to sequentially describe a method of controlling the screen on the first display 825 while the vehicle display apparatus 800, ejected outward, moves in the direction of the front passenger seat.

In an embodiment, only in a case where the vehicle display apparatus 800 moves to the position corresponding to the front passenger seat in a state of being ejected outward from the frame 802 or is ejected after moving to the position, the vehicle display apparatus 800 may operate such that the screen on the first display 825 switches to the split-screen mode.

To this end, the vehicle display apparatus 800 includes the first drive module 830*a* and the second drive module 830*b*. The first drive module 830*a* is coupled to the display unit 820, that is, the second display, and operates in response to a control signal from the control unit 850, that is, the first drive signal, such that the second display moves along the slot 801 of the frame 802 in the transverse direction. In addition, in response to a control signal from the control unit 850, that is, the second drive signal, the second drive module 830*b* operates such that at least one portion of the second display is retracted into the internal space of the frame 802 or ejected outward therefrom.

The control unit 850 of the vehicle display apparatus 800 generates the second screen for the front passenger seat on the first display 825 based on the movement of the second display to the position corresponding to the front passenger seat within the vehicle in response to the operation of the first drive module 830*a*.

In an embodiment, in a state where at least one portion of the second display is ejected outward in response to the operation of the second drive module 830*b*, the control unit 850 of the vehicle display apparatus 800 may generate the second screen for the front passenger seat on the first display 825 based on the movement of the second display to the position corresponding to the front passenger seat in response to the operation of the first drive module 830*a*. When the second screen is generated in this manner, the control unit 850 may output a control screen/execution screen for controlling the second screen on the second display.

FIG. 9 illustrates sequential operations of displaying the second screen by executing the split-screen mode of the first display 825 and displaying the control screen/execution screen for the second screen on the second display.

(a) of FIG. 9 illustrates that the second display, that is, the display unit 820 is positioned in such a manner as to correspond to the driver's seat (the center) with of the vehicle 100 in a state of being retracted into the internal space of the frame 802, this state representing the initial state of the vehicle display apparatus 800.

Next, in response to the operation of the second drive module 830*b* of the vehicle display apparatus 800, as illustrated in (b) of FIG. 9, the display unit 820 is ejected outward from the slot 801 formed on the lower end portion of the frame 802. A control screen 902 for controlling a first screen 901 displayed on the first display 825 may be output on the ejected display unit 820.

Subsequently, in response to the operation of the first drive module 830*a* of the vehicle display apparatus 800, as illustrated in (c) of FIG. 9, the display unit 820 moves to the position corresponding to the front passenger seat along the slot 801 of the frame 802. When the horizontal movement of the display unit 820 is completed, the screen on the first display 825 switches to the split-screen mode and is split into a reduced first screen 901' and a second screen 903 for the occupant in the front passenger seat. Concurrently or sequentially, a control screen/execution screen 904 for the second screen 903 for the occupant in the front passenger seat is now displayed on the display unit 820.

In a case where the display unit 820 of the vehicle display apparatus 800 moves toward the front passenger seat in a state of being retracted into the internal space of the frame 802, the second screen for the occupant in the front passenger seat occupant may not be immediately generated on the first display 825.

Figure 10A:
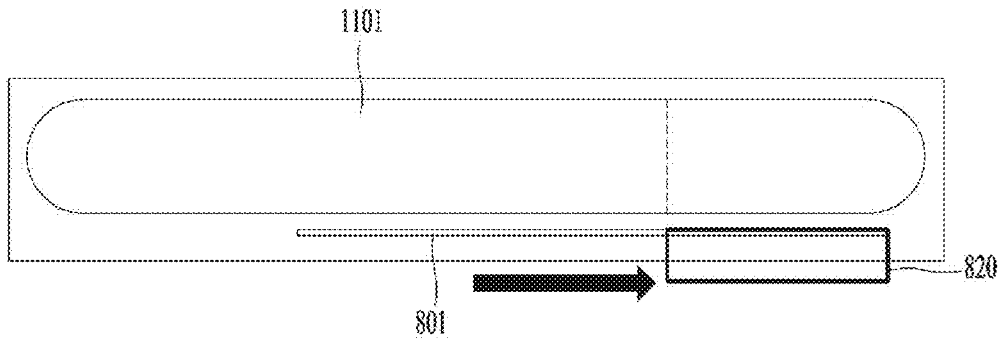
FIGS. 10A and 10B are illustrative views that are referenced to sequentially describe the method of displaying the screen on the first display in a case where the vehicle display apparatus moves in the direction of the front passenger seat in a state of being retracted inward.
Figure 10B:
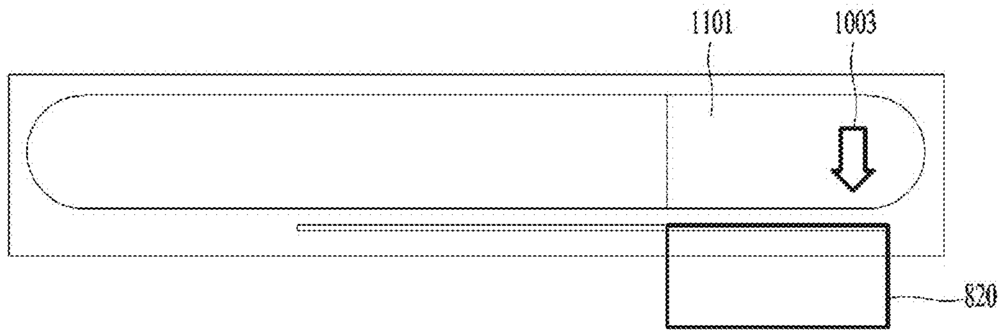

FIGS. 10A and 10B are illustrative views that are referenced to sequentially describe the method of displaying the screen on the first display 825 in a case where the vehicle display apparatus 800 moves in the direction of the front passenger seat in a state of being retracted inward.

According to an embodiment, the second display, that is, the display unit 820, moves to the position corresponding to the front passenger seat in response to the first drive module 820*a*, in a state where the second display, that is, the display unit 820, is retracted into the internal space of the frame in response to the operation of the second drive module 830*b* of the vehicle display apparatus 800, or while the display unit 820 maintains the initial state thereof. Based on this movement of the display unit 820, the control unit 850 may display visual information for providing guidance for the operation of the second drive module 830*b* on the second screen for the front passenger seat, such that the second display is ejected outward from the frame 802.

In another embodiment, the screen on the first display 825 remains in the full-screen mode until the second display is ejected, and the visual information for providing guidance for the operation of the second drive module 830*b* may be displayed on the first display 825 such that the second display is ejected outward from the frame 802.

With reference to FIG. 10A, in response to the operation of the first drive module 830*a*, the vehicle display apparatus 800 may move toward the front passenger seat in a state where the display unit 820 is retracted into the internal space of the frame. At this point, the state in which the display unit 820 is retracted into the internal space of the frame may refer to a case where only one portion of the display unit 820 is exposed outward therefrom.

In this case, the first screen for the driver may continue to be displayed on the first display 825 in the full-screen mode. As illustrated in FIG. 10B, guidance information 1003 for providing guidance for the outward ejection of the second display may be displayed on one side of a region 1101 where the second is scheduled to be displayed.

The second drive signal for operating the second drive module 830*b* may be generated based on the application of the touch input in a guidance direction to a region where the guidance information 1003 is displayed or the application of a sliding input in the downward direction to one exposed portion of the second display. Of course, the second drive signal may be generated through a preset input method (e.g., a hand gesture input, a voice command, a maneuver on a console, or the like).

When in response to the operation of the second drive module 830*b*, the second display, that is, the display 820, is ejected outward from the frame from a position corresponding to the front passenger seat, the second screen is displayed in the region 1101 where the second screen on the first display 825 is scheduled to be displayed, and the control screen/execution screen for the second screen appears on the ejected second display.

Switching to the full-screen mode, as well as the split-screen mode of the first display 825, may also be performed in a sequential operation.

Figure 11:
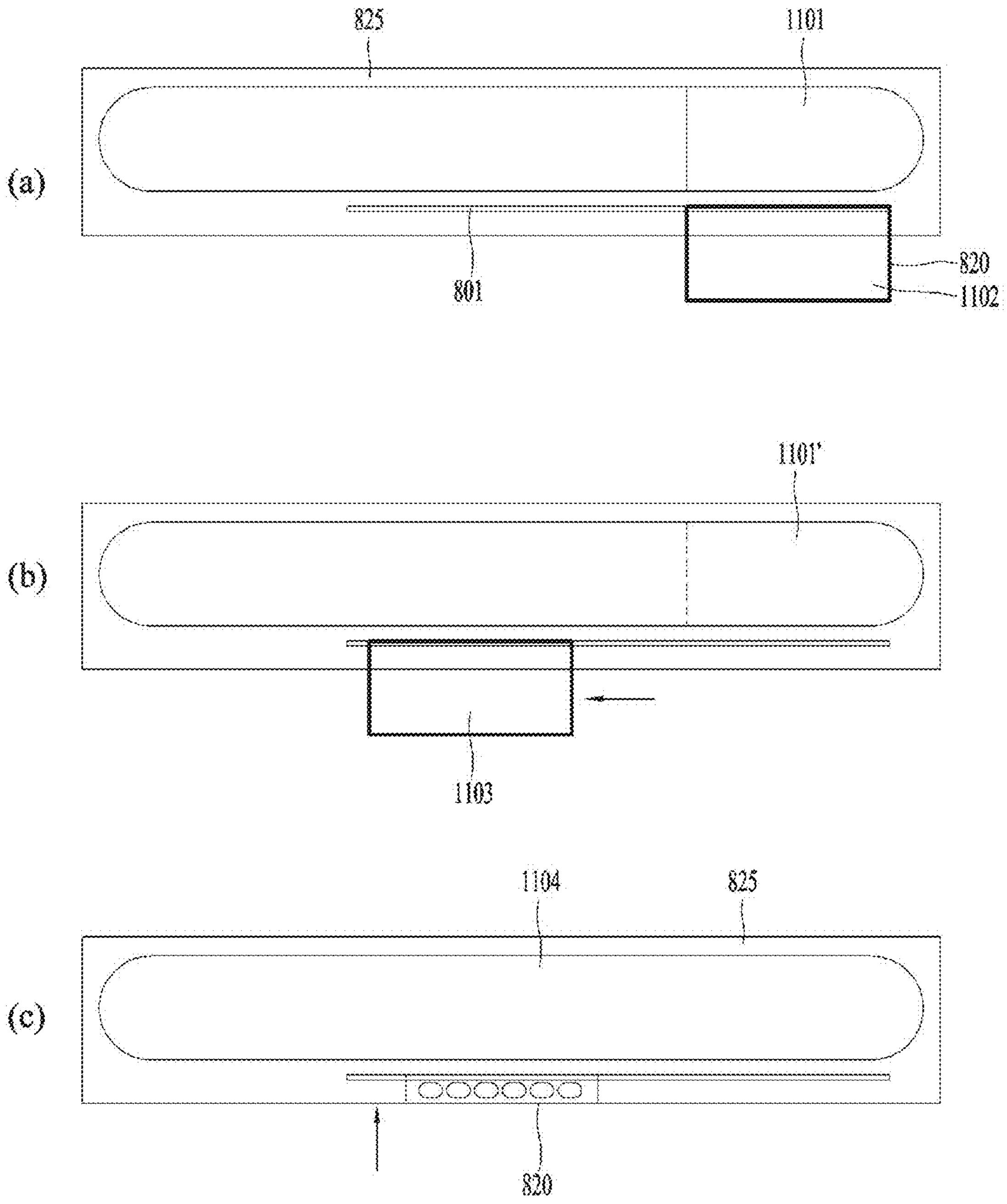
FIG. 11 is an illustrative view that is referenced to sequentially describe the method of controlling the screen on the first display when the vehicle display apparatus moves from the front passenger seat to the direction of the driver's seat.

FIG. 11 is an illustrative view that is referenced to sequentially describe the method of controlling the screen on the first display 825 when the vehicle display apparatus 800 moves from the front passenger seat to the direction of the driver's seat.

According to an embodiment, in a state where the first display 825 of the vehicle display apparatus 800 operates in the split-screen mode and where the second screen for the occupant in the front passenger seat is displayed, the second display moves to the initial position thereof corresponding to the driver's seat (or the center) in response to the operation of the first drive module 830*a*, and then at least one portion of the second display unit is retracted into the internal space of the frame in response to the operation of the second drive module 830*b*. Based on this retraction, the control unit 850 may perform screen control such that the first screen on the first display 825 expands to cover a display region of the second screen.

In other words, after switching to the initial state at the initial position takes place, the display unit 820 may operate such that the screen on the first display 825 returns to the full-screen mode.

With reference to (a) of FIG. 11, while the display unit 820 of the vehicle display apparatus 800 maintains the ejected state at the position corresponding to the front passenger seat, the screen on the first display 825 operates in the split-screen mode, displaying the first screen for the driver and the second screen 1101 for the occupant in the front passenger seat. At this point, a control screen/execution screen 1102 associated with the second screen 1101 for the occupant is displayed on the display unit 820, that is, the second display, thereby enabling the occupant in the front passenger seat to control the second screen 1101.

The first display 825 is triggered to switch from the split-screen mode to the full-screen mode based on the movement of the display unit 820 from the front passenger seat to the position corresponding to the driver's seat (or the center) in response to the operation of the first drive module 830*a* according to the first drive signal.

When the screen on the first display 825 is triggered to switch to the full-screen mode in this manner, as illustrated in (b) of the FIG. 11, the second screen for the occupant in the front passenger seat gradually changes to an extension screen 1101' of the first screen for the driver. A control screen/execution screen 1103 associated with the first screen on the first display 825 is displayed on the display unit 820. Accordingly, the driver may now control the screen on the first display 825 through the display unit 820.

Subsequently, based on the non-detection of the input to the display unit 820 moving toward the driver's seat after a predetermined time elapses, the vehicle display apparatus 800 may generate the second drive signal for operating the second drive module 830*b* such that the display unit 820 is retracted into the internal space of the frame 802.

Next, as illustrated in (c) of FIG. 11, based on the retraction of the display unit 820 into the inner space of the frame 802, the entire screen on the first display 825 switches to a first screen 1104 for the driver, for example, to the navigation execution screen.

As another embodiment, based on the non-detection of the input to the display unit 820 moving toward the driver's seat after a predetermined time elapses, guidance information for providing guidance for the retraction of the display unit 820 into the internal space of the frame may be output on the first display 825. In this case, based on a response input to the guidance information output to the first display 825, the second drive module 830*b* operates, thereby enabling the display unit 825 to be retracted into the internal space of the frame.

In addition, although not illustrated, when the second drive module 830*b* re-operates and thus the display unit 820 is exposed outward from the frame within a predetermined time after the display unit 820 is retracted into the inner space of the frame, the screen displayed immediately before the display unit 820 is retracted may be resumed. For example, the control screen/execution screen for the first screen displayed on the first display 825 may be displayed immediately.

Figure 12A:
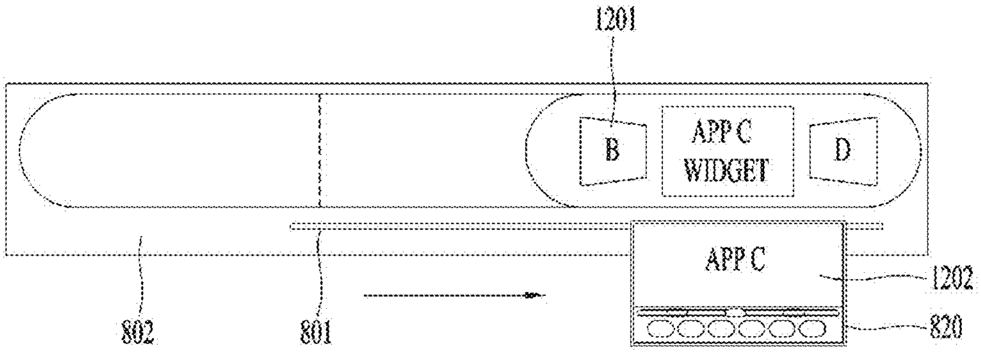
FIGS. 12A and 12B are views that are referenced to describe examples where a screen on the second display, which moves horizontally according to an embodiment of the present disclosure, switches.
Figure 12B:
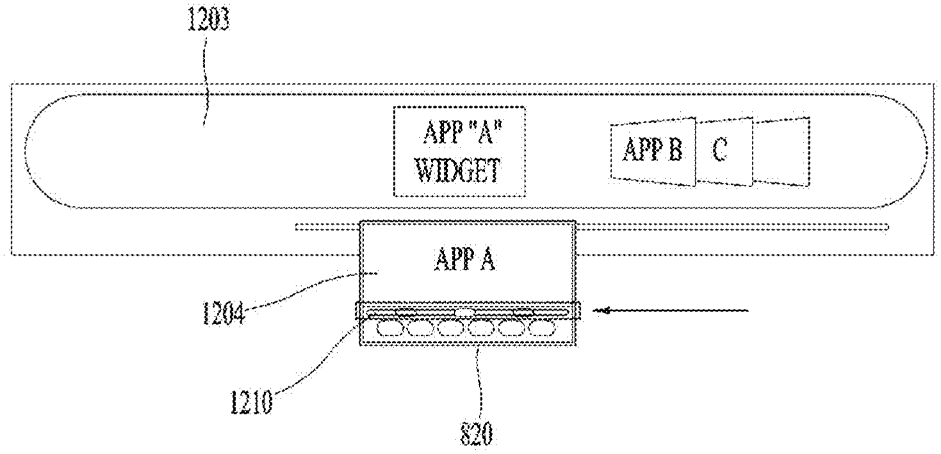

FIGS. 12A and 12B are views that are referenced to describe examples where the screen on the second display, which moves horizontally in response to the operation of the first drive module 830*a*, switches.

In an embodiment, the control unit 850 of the vehicle display apparatus 800 may detect that the second display moves to the position corresponding to the driver's seat in response to the operation of the first drive module 803*a* in a state where the first display 825 operates in the split-screen mode and the occupant in the front passenger seat is displayed on the second screen and where at least one portion of the second display, that is, the display unit 820 is ejected outward from the frame 802.

In this case, the control unit 850 of the vehicle display apparatus 800 may perform screen control such that the first screen displayed on the first display 825 expands to cover the display area of the second screen. Accordingly, the screen on the first display 825 switches from the split-screen mode to the full-screen mode.

For example, with reference to FIG. 12A, the first display 825 switches to the split-screen mode based on the movement of the display unit 820 of the vehicle display apparatus 800, that is, the second display to the position corresponding to the front passenger seat along the slot 801 formed on the frame 802. Accordingly, a second screen 1201 for the occupant in the front passenger seat is displayed on the right-side region of the first display 825.

At this point, the second screen 1201, for example, may be a menu screen of an application that may be executed by the occupant in the front passenger seat. A control screen/execution screen 1202 associated with the second screen 1201 on the first display 825 may be displayed on the second display, that is, the display unit 820, that has moved to the position corresponding to the front passenger seat. The control screen/execution screen 1202 may be a detailed information/execution screen of an application selected from a menu screen of an application, which is the second screen 1201. In this case, an application/widget selectable from the menu screen on the second screen 1201 on the first display 825 may move leftward or rightward based on a sliding touch input to the display unit 820. Based on the touch input on the display unit 820, an application to be displayed through the second screen 1201 on the first display 825 may be selected and executed.

Subsequently, with reference to FIG. 12B, based on the movement of the second display from the position corresponding to the front passenger seat to the position corresponding to the driver's seat (or the center) in response to the operation of the first drive module 830*a*, the screen on the first display 825 changes from the split-screen mode to the full-screen mode.

When the first display 825 expands from the split-screen mode to the full-screen mode, in most cases, the first screen for the driver's seat expands to cover the full screen. However, exceptionally, when the vehicle 100 is not traveling and only a preset background image, instead of the navigation execution screen, is displayed as the first screen, the second screen may expand to cover the full screen. FIG. 12B illustrates this example. The menu screen that is the second screen is displayed, as a first screen 1203, on the entire first display 825. At this point, a control/execution screen 1204 associated with the first screen 1203 displayed on the first display 825 switching to the full-screen mode is displayed on the second display, that is, the display unit 820 that has moved toward the driver's seat. That is, based on the movement of the display unit 820, a screen on the display unit 820 also switches.

When a screen displayed in response to the movement of the second display, that is, the display unit 820 switches, a notification sign for notifying that the screen on the display unit 820 switches may be displayed on one side of the display unit 820, for example, a lower portion thereof.

Figure 13A:
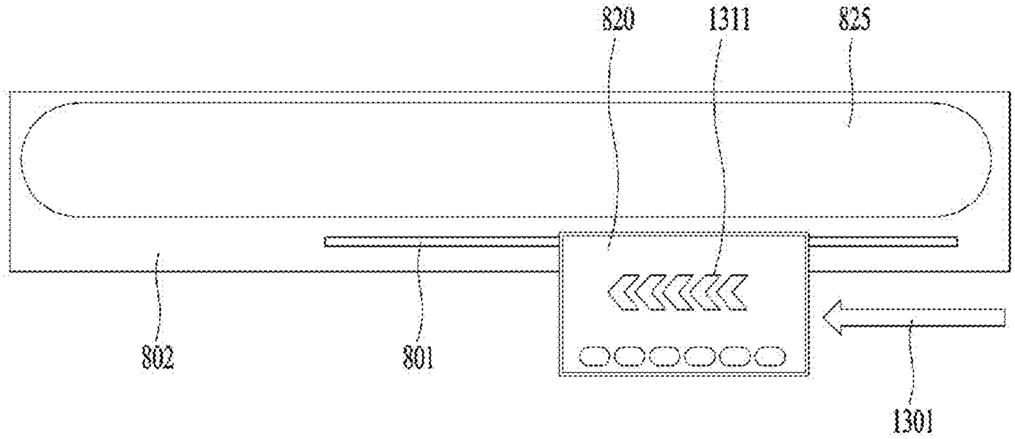
FIGS. 13A and 13B are views illustrating examples in which guidance information indicating a movement direction is displayed while the second display moves horizontally according to the embodiment of the present disclosure.
Figure 13B:
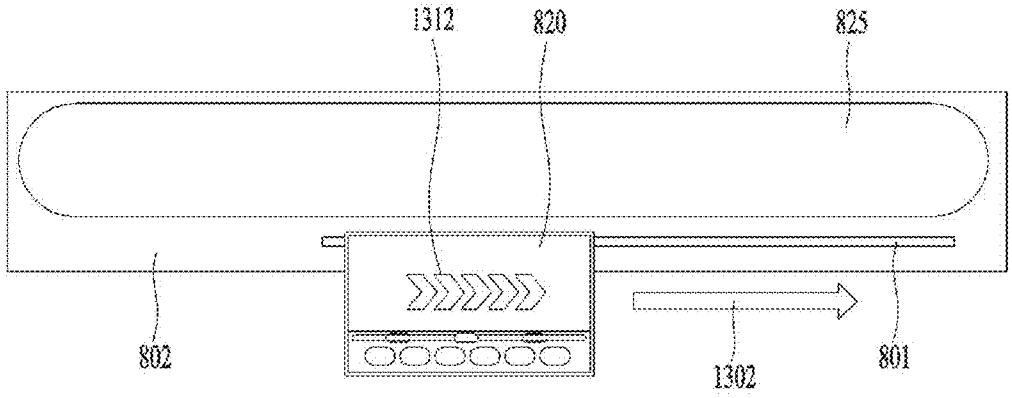

FIGS. 13A and 13B are views illustrating examples in which guidance information indicating a movement direction is displayed while the second display, that is, the display unit 820 moves horizontally.

According to an embodiment, the control unit 850 of the vehicle display apparatus 800 may display visual information indicating the movement direction on the display unit 820 while the second display, that is, the display unit 820, moves horizontally from the driver's seat (or, the center) to the position corresponding to the front passenger seat.

For example, with reference with FIG. 13B, when the display unit 820 starts to move from the leftward direction to the rightward direction 1302 in response to the operation of the first drive module 830*a* of the vehicle display apparatus 800, an arrow image 1312 may be displayed, as visual information corresponding to the movement direction, on the display unit 820. At this point, when the movement of the display unit 820 is completed, the arrow image 1312 switches to the control screen/execution screen associated with the second screen, for the occupant in the front passenger seat, on the first display 825.

In addition, in an embodiment, when the second display stops at the position corresponding to the front passenger seat, the control screen/execution screen associated with the second screen for the occupant in the front passenger seat, which is output on the first display 825 at that time, is output on the second display, that is, the display unit 820.

Although not illustrated, in a case where the display unit 820 moves horizontally along the slot 801 in a state of being retracted into the internal space of the frame 802, the arrow image 1312 indicating the movement direction while the display unit 820 moves may be displayed in one region of the first display 825, for example, on a lower end portion thereof.

In addition, the control unit 850 of the vehicle display apparatus 800 may display the visual information indicating the movement direction on the display unit 820 while the second display, that is, the display unit 820, moves horizontally from the front passenger seat to the position corresponding to the driver's seat (the center).

For example, with reference to FIG. 13B, when the display unit 820 starts to move from the rightward direction to the leftward direction 1301 in response to the operation of the first drive module 830*a* of the vehicle display apparatus 800, an arrow image 1311 may be displayed, as visual information corresponding to the movement direction, on the display unit 820. At this point, when the movement of the display unit 820 is completed, the arrow image 1311 switches to the control screen/execution screen associated with the first screen, for the driver, on the first display 825.

In addition, in an embodiment, when the second display stops at the position corresponding to the driver's seat (the center), the control screen/execution screen associated with the first screen for the driver, which is output on the first display 825 at that time, is output on the second display, that is, the display unit 820.

Although not illustrated, in the case where the display unit 820 moves horizontally along the slot 801 in a state of being retracted into the internal space of the frame 802, the arrow image 1311 indicating the movement direction while the display unit 820 moves may be displayed in one region of the first display 825, for example, on the lower end portion thereof.

At this point, after the second displays starts to move and when the travel distance reaches or exceeds a reference, screen control of the first display 825 may be first performed. For example, when the second display moves a predetermined distance after starting to move to the position corresponding to the front passenger seat, a screen on the first display 825 first switches to the split-screen mode, and the control screen/execution screen associated with the second screen for the occupant in the front passenger seat may be output on the second display at a point in time when the second display reaches and stops at the position corresponding to the front passenger seat. In addition, for example, when the second display moves a predetermined distance after starting to move to the position corresponding to the driver's seat (or the center), a screen on the first display 825 first switches to the full-screen mode, and the control screen/execution screen associated with the first screen for the driver may be output on the second display at a point in time when the second display reaches and stops at the position corresponding to the driver's seat (or the center).

Figure 14:
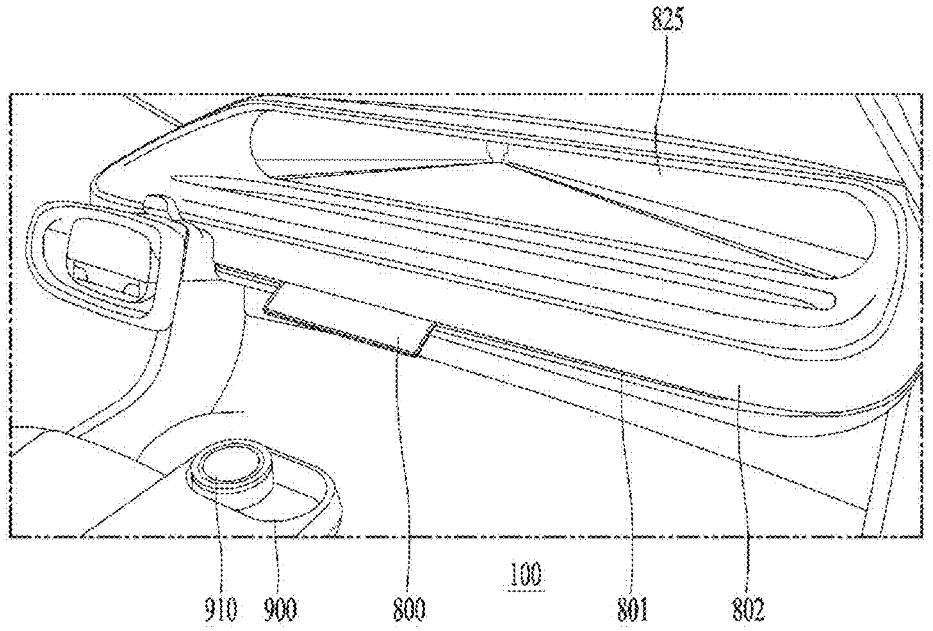
FIG. 14 is a view that is referenced to describe a console for controlling the movement of the vehicle display apparatus according to the embodiment of the present disclosure.

FIG. 14 is a view that is referenced to describe a console 900 for controlling the movement of the vehicle display apparatus 800.

The term "console" used in the present specification refers to a maneuver unit or an input device for controlling the operation of the vehicle display apparatus 800.

In an embodiment, the console 900 illustrated in FIG. 14 may be understood as the same device as the input device 860 in FIG. 2. In this case, the console 900 may be understood as being integrally formed with the vehicle display apparatus 800.

In addition, in another embodiment, the console 900 may be understood as a separate input device distinct from the vehicle display apparatus 800. In this case, when turned on, the console 900 may be connected in a wired/wireless manner to enable communication with the vehicle display apparatus 800.

The console 900, as illustrated in FIG. 14, may be positioned between the driver's seat and the front passenger seat, which are the front seats of the vehicle 100. Accordingly, both the driver seated in the driver's seat and the occupant seated in the front passenger seat can easily operate the console 900 without changing their seated posture.

The console 900 may include a maneuver unit 910 formed to move within the frame and/or to be tiltable. In addition, although not illustrated, the console 900 may include a sensor for detecting the movement and/or tilting of the maneuver unit 910. In addition, the console 900 may include a processor (not illustrated) for generating a signal corresponding to a sensing value obtained by detection and transferring the generated signal to the vehicle display apparatus 800, and a communication module (not illustrated).

Different signals may be transferred from the console 900 to the vehicle display apparatus 800, depending on the movement direction of the maneuver unit 910.

For example, in response to the movement of the maneuver unit 910 in the direction from the driver's seat (or the center) toward the front passenger seat, the first drive signal for moving the vehicle display apparatus 800 from the driver's s seat (or the center) to the front passenger seat may be generated. Then, based on the first drive signal, the vehicle display apparatus 800 moves toward the front passenger seat along the transverse direction of the slot 801 of the frame 802.

In addition, in response to the movement of the maneuver unit 910 in the direction from the front passenger seat toward the driver's seat (or the center), the first drive signal for moving the vehicle display apparatus 800 from the front passenger seat to the driver's seat may be generated. Then, based on the first drive signal, the vehicle display apparatus 800 moves toward the driver's seat (or the center) along the transverse direction of the slot 801 of the frame 802.

Different signals may be transferred from the console 900 to the vehicle display apparatus 800, depending on the tilting direction of the maneuver unit 910.

For example, in response to the tilting of the maneuver unit 910 in the downward direction (or toward the rear seat within the vehicle 100), the second drive signal for ejecting the vehicle display apparatus 800 outward from the internal space of the frame 802 through the slot 801 may be generated. Then, based on the second drive signal, the vehicle display apparatus 800 is gradually ejected outward through the slot 801 of the frame 802.

In addition, in response to the tilting of the maneuver unit 910 in the upward direction (or toward the UHD in front of the front seat within the vehicle 100, the second drive signal for moving the vehicle display apparatus 800 to be retracted into the internal space of the frame 802 may be generated. Then, based on the second drive signal, the vehicle display apparatus 800 is gradually retracted into the internal space of the frame 802 through the slot 801 of the frame 802.

The vehicle control device 800 may receive a signal, resulting from operating the console 900, from the console 900 through the communication unit 810.

Specifically, the vehicle display apparatus 800 generates the first drive signal based on the first signal, resulting from the first maneuver on the console 900, and controls the operation of the first drive module **830*a* based on the generated first drive signal, thereby moving the vehicle display apparatus 800** in the first movement direction.

At this point, the first signal, resulting from the first maneuver on the console 900, is a signal that triggers the movement of the vehicle display apparatus 800 along the slot 801 relative to the frame 802 in the transverse direction. In addition, the generated first drive signal triggers the operation of the first drive module **830*a* such that the vehicle display apparatus 800 moves along the slot 801 in the transverse direction. Accordingly, the vehicle display apparatus 800** moves between the driver's seat (or the center) and the front passenger seat in the first movement direction.

The vehicle display apparatus 800 generates the second drive signal based on the second signal, resulting from the second maneuver on the console 900, and controls the operation of the second drive module **830*b* based on the generated second drive signal, thereby moving the vehicle display apparatus 800** in the second movement direction.

At this point, the second signal, resulting from the second maneuver on the console 900, is a signal that triggers the ejection of the vehicle display apparatus 800 from the slot 801 relative to the frame 802 or the retraction of the vehicle display apparatus 800 into the internal space along the slot 801 (that is, the movement of the vehicle display apparatus 800 in the longitudinal direction). In addition, the generated second drive signal triggers the operation of the second drive module **830*b* such that the vehicle display apparatus 800 is retracted into the internal space of the slot 801 or ejected outward therefrom. Accordingly, the vehicle display apparatus 800 moves in the second movement direction to be ejected outward from the slot 802 or retracted into the internal space of the slot 802**.

In an embodiment, the vehicle display apparatus 800 may include a large-sized display 825 mounted in a rectangular shape within the frame 820. In this case, screen control of at least one portion of the screen displayed on the large-sized display 825 may be performed based on the movement of the vehicle display apparatus 800.

For example, based on the movement of the vehicle display apparatus 800 in the first direction, screen control of at least one portion of a screen on the large-sized display 825 may be performed to switch from a screen associated with vehicle travel to a screen for the front passenger seat or vice versa.

In addition, for example, based on the movement of the vehicle display apparatus 800 in the second direction, screen control of at least one portion of a screen on the large-sized display 825 may be performed to switch to a screen corresponding to an activated or deactivated state of the vehicle display apparatus 800.

As described above, the first drive signal and the second drive signal for moving the vehicle display apparatus 800 in different directions may be generated through various input methods. A specific method of controlling the movement of the vehicle display apparatus 800 by generating the first drive signal and the second drive signal based on the maneuver on the console is described below.

Figure 15A:
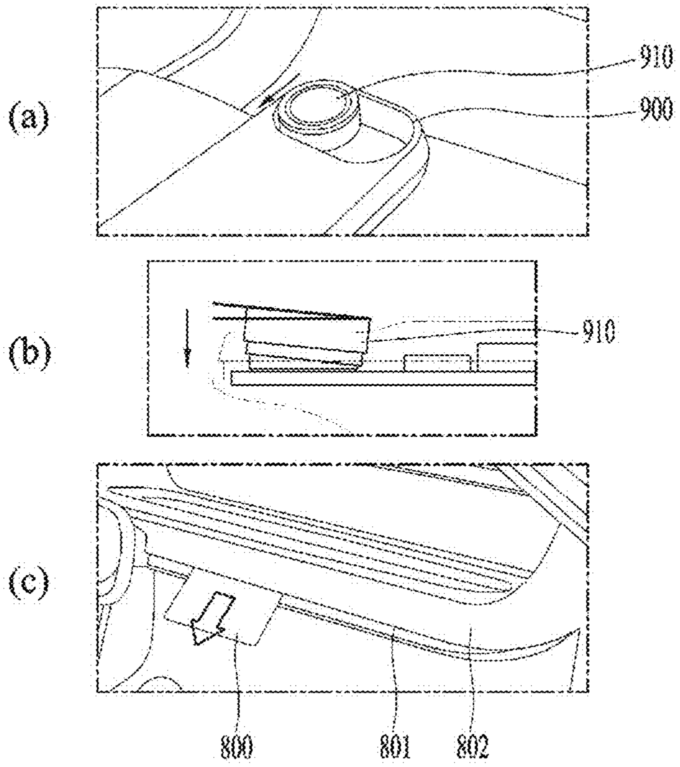
FIGS. 15A to 15D are views that are referenced to describe the movement of the vehicle display apparatus in different directions, that is, a vertical direction or a horizontal direction in response to various maneuvers on a console according to an embodiment of the present disclosure.
Figure 15B:
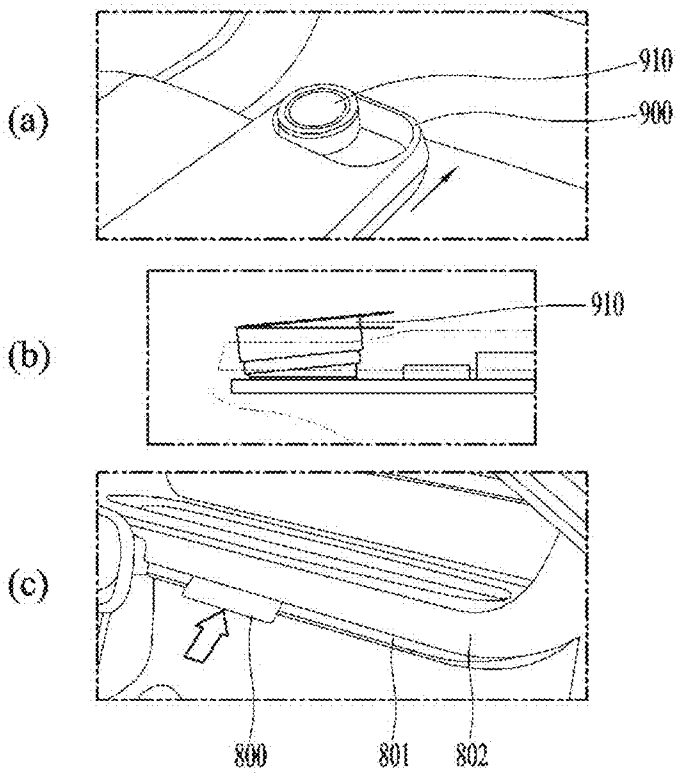
Figure 15C:
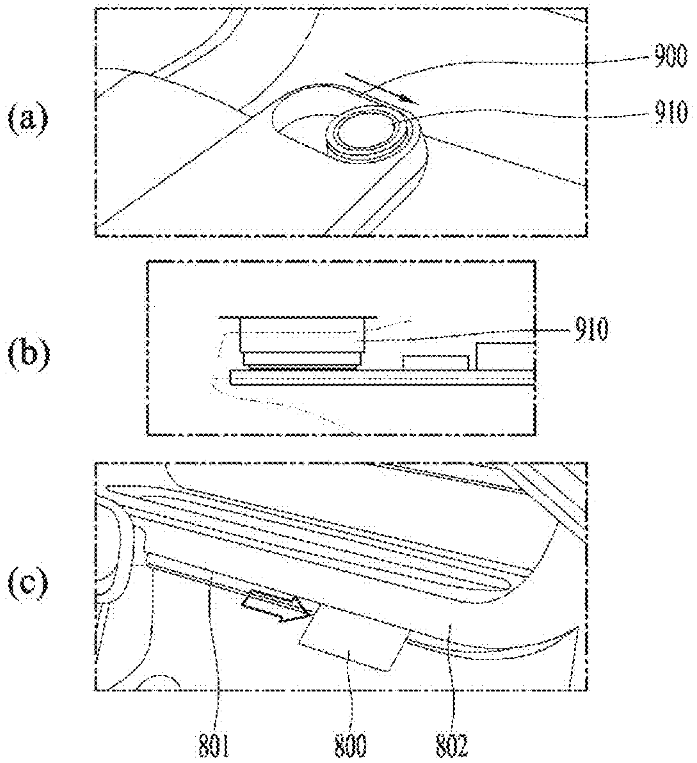

FIGS. 15A to 15C are views that are referenced to describe the movement of the vehicle display apparatus 800 in different directions, that is, a vertical direction or a horizontal direction in response to various maneuvers on the console 900.

Figure 15D:
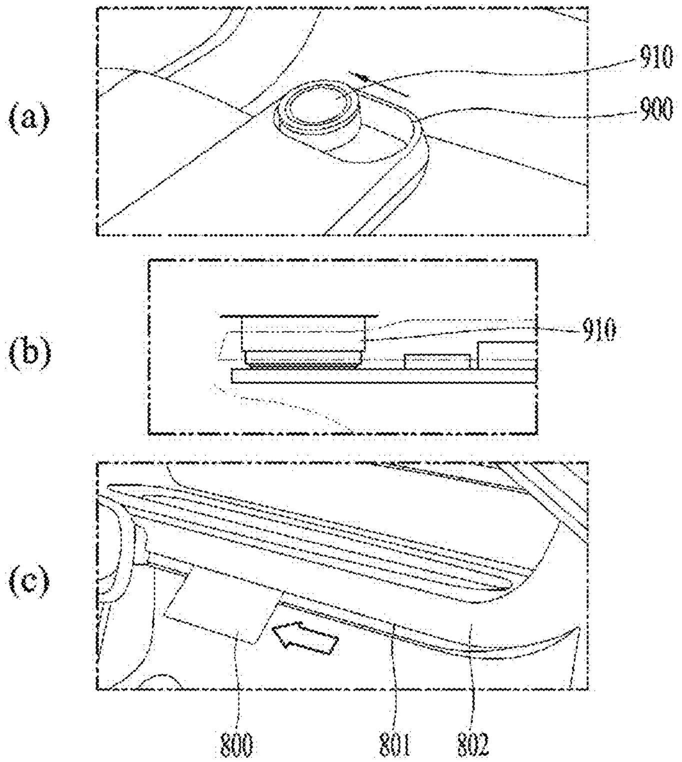

Specifically, FIGS. 15C and 15D illustrate examples where the first drive signal for moving the vehicle display apparatus 800 in the first movement direction is generated based on the first signal, resulting from the first maneuver on the console 900. At this point, the movement of the vehicle display apparatus 800 in the first direction refers to movement of the vehicle display apparatus 800 between the driver's seat (or the center) and the front passenger seat within the vehicle 100.

FIGS. 15A and 15B illustrate examples where the first drive signal for moving the vehicle display apparatus 800 in the second movement direction is generated based on the second signal, resulting from the second maneuver on the console 900. At this point, the movement of the vehicle display apparatus 800 in the second direction refers to hiding of the vehicle display apparatus 800 into the internal space of the frame or outward exposure of the vehicle display apparatus 800 from the internal space thereof.

The console 900, as illustrated in FIGS. 15A TO 15D, may be used as a maneuver unit or an input device for controlling the movement of the vehicle display apparatus 800.

The console 900 is connected to enable communication with the vehicle display apparatus 800 when the vehicle display apparatus 800 is in an activated state, and receive a signal corresponding to an input to the maneuver unit 910 of the console 900. The vehicle display apparatus 800 operates at least one of the plurality of drive units 830 based on the received signal and thus moves the vehicle display apparatus 800 in a direction matching the input.

When the vehicle display apparatus 800 is in a deactivated state, the console 900 may be disconnected from the vehicle display apparatus 800 and may switch to a state where a signal corresponding to the input to the maneuver unit 910 of the console 900 cannot be received.

The console 900, as illustrated in FIGS. 15A to 15D, includes the maneuver unit 910 configured to move or tilt in the left-right direction and the up-down direction within a fixed frame.

In an embodiment, the fixed frame may have an elliptical shape elongated in the transverse direction. The maneuver unit 910 positioned within the fixed frame may have a circular shape. Specifically, the fixed frame may be formed in such a manner that the length thereof in the transverse direction is greater than that of the maneuver unit 910 to enable the maneuver unit 910 to move in the horizontal direction. The vertical frame may be formed in such a manner that the longitudinal length is substantially the same as that of the maneuver unit 910 to enable the maneuver unit 910 to tilt only in the vertical direction.

The maneuver unit 910 may be referred to as a 'moving frame' in that it is configured to be movable relative to the fixed frame. In addition, the maneuver unit 910 may be referred to as a 'controller' in that it is a module configured to be tiltable through a user input. The maneuver unit 910, the movement frame, and the controller may all be used interchangeably with the same meaning.

With reference to FIGS. 15C and 15D, a specific method of generating a first drive signal for moving the vehicle display apparatus 800 based on the first signal in response to the first maneuver on the console 900 is described below.

With reference to FIGS. 15C and 15D, the console 900 positioned between the driver's seat and the front passenger seat within the vehicle 100 may detect the first maneuver in which the maneuver unit 910 within the fixed frame moves or tilts in the leftward/rightward direction and generate the first signal in response to the first maneuver.

Specifically, with reference t to FIG. 15C, a moving frame 910 of the console 900 may initially move to the position corresponding to the passenger's in a state of being fixed at a position corresponding to the driver's seat (or the center) within the fixed frame.

Based on the movement of the moving frame 910 to the position corresponding to the front passenger seat through the user input (a), a sensor (not illustrated) provided in the console 900 may detect a change in the position of the moving frame 910. At this point, the moving frame 910 maintains a horizontal position without tilting in the up-down direction (b). Accordingly, the sensor in the console 900 generates a first tilting signal that matches the movement of the moving frame 910 that moves/tilts only in the rightward direction. The generated first tilting signal is transferred to the vehicle display apparatus 800 through the communication module. When the first tilting signal is transferred to the control unit 850 through the communication unit 810 of the vehicle display apparatus 800, the first drive signal corresponding to the first tilting signal is generated. The control unit 850 transfers the generated first drive signal to the first drive module 830*a*. At this point, the first drive signal corresponding to the first tilting signal includes detailed direction information, thereby determining the driving direction of a motor of the first drive module 830*a*. In response to this operation of the first drive module 830*a*, the vehicle display apparatus 800 moves in the horizontal direction toward the front passenger seat along the slot 801 of the frame 802 (*c*).

With reference to FIG. 15D, the moving frame 910 of the console 900 may move to the position corresponding to the driver's seat (or the center) in a state of being fixed at the position corresponding to the front passenger seat within the fixed frame.

Based on the movement of the moving frame 910 to the position corresponding to the driver's seat (or the center) through a user maneuver (a), the sensor (not illustrated) provided in the console 900 may detect the change in the position of the moving frame 910. At this point, the moving frame 910 maintains a horizontal orientation without tilting in the up-down direction (b). Accordingly, the sensor in the console 900 generates a second tilting signal that matches the movement of the moving frame 910, which moves/tilts only in the leftward direction. The generated second tilting signal is transferred to the vehicle display apparatus 800 through the communication module. When the second tilting signal is transferred to the control unit 850 through the communication unit 810 of the vehicle display apparatus 800, the first drive signal corresponding to the second tilting signal is generated. The control unit 850 transfers the generated first drive signal to the first drive module 830*a*. At this point, the first drive signal corresponding to the second tilting signal includes detailed direction information, thereby determining the driving direction of the motor of the first drive module 830*a*. In response to this operation of the first drive module 830*a*, the vehicle display apparatus 800 moves in the horizontal direction toward the driver's seat (or the center) along the slot 801 of the frame 802 (*c*).

Subsequently, with reference to FIGS. 15A and 15B, a specific method of generating the second drive signal for moving the vehicle display apparatus 800 based on the second signal in response to the second maneuver on the console 900 is described below.

With reference to FIGS. 15A and 15B, the console 900 positioned between the driver's seat and the front passenger seat within the vehicle 100 may detect the second maneuver in which an upper/lower portion of the maneuver unit 910 within the fixed frame tilts and generate the second signal in response to the detected second maneuver.

Specifically, with reference to FIG. 15A, the lower portion of the moving frame 910 of the console 900 may tilt in a state where the moving frame 910 is fixed at the position corresponding to the driver's seat (or the center) or the front passenger seat within the fixed frame.

Based on this tilting of the lower portion of the moving frame 910 through the user maneuver (a), the sensor (not illustrated) provided in the console 900 may detect the change in the position of the moving frame 910. At this point, the moving frame 910 does not move in the left-right direction, but the lower portion of the moving frame 910 tilts in the vertical direction (b). As the lower portion of the moving frame 910 tilts, a change in angle (e.g., 10 degrees or greater) may be detected through the sensor (not illustrated) in the moving frame 910. The console 900 generates a third tilting signal that matches the movement of the tilted moving frame 910. The generated third tilting signal is transferred to the vehicle display apparatus 800 through the communication module. When the third tilting signal is transferred to the control unit 850 through the communication unit 810 of the vehicle display apparatus 800, the second drive signal corresponding to the third tilting signal is generated. The control unit 850 transfers the generated second drive signal to the second drive module 830*b*. At this point, the second drive signal corresponding to the third tilting signal includes detailed direction information, thereby determining the driving direction of a motor of the second drive module 830*b*. In response to this operation of the second drive module 830*b*, the vehicle display apparatus 800 is ejected outward from the internal space of the frame 802 along the slot 801 of the frame 802 of the vehicle (c).

With reference to FIG. 15B, the upper portion of the moving frame 910 of the console 900 may tilt in the state where the moving frame 910 is fixed at the position corresponding to the driver's seat (or the center) or the front passenger seat within the fixed frame.

Based on this tilting of the upper portion of the moving frame 910 through the user maneuver (a), the sensor (not illustrated) provided in the console 900 may detect the change in the position of the moving frame 910. At this point, the moving frame 910 does not move in the left-right direction, but only the upper portion of the moving frame 910 tilts in the vertical direction (b). As the upper portion of the moving frame 910 tilts, a change in angle (e.g., 10 degrees or greater) may be detected through the sensor (not illustrated) in the moving frame 910. The console 900 may generate a fourth tilting signal that matches the movement of the tilted moving frame 910. The generated fourth tilting signal is transferred to the vehicle display apparatus 800 through the communication module. When the fourth tilting signal is transferred to the control unit 850 through the communication unit 810 of the vehicle display apparatus 800, the second drive signal corresponding to the fourth tilting signal is generated. The control unit 850 transfers the generated second drive signal to the second drive module 830*b*. At this point, the second drive signal corresponding to the fourth tilting signal includes detailed direction information, thereby determining the driving direction of the motor of the second drive module 830*b*. In response to this operation of the second drive module 830*b*, the vehicle display apparatus 800 is gradually retracted into the internal space of the frame 802 through the slot 801 of the frame 802 of the vehicle (c).

In a case where it is unclear whether the upper portion or lower portion of the moving frame 910 tilts, the console 900 may generate the third tilting signal or the fourth tilting signal based on the angular difference of the moving frame 910 caused by the tilting.

For example, when the lower portion of the moving frame 910 of the console 900 experiences a greater change in angle than the upper portion thereof, the third tiling signal for ejecting the vehicle display apparatus 800 outward from the frame 802 may be generated. In addition, for example, when the upper portion of the moving frame 910 of the console 900 experiences a greater change in angle than the lower portion thereof, the fourth tiling signal for retracting the vehicle display apparatus 800 into the internal space of the frame 802 may be generated.

In this manner, the first drive signal and the second drive signals that are received by the vehicle display apparatus 800 are determined depending on the direction of movement/tiling applied to the moving frame 910 of the console 900 or the controller.

The vehicle display apparatus 800 determines the driving direction of the first drive module 830*a* corresponding to the first drive signal and/or the driving direction of the second drive module 830*b* corresponding to the second drive signal based on the direction information of each tilting in response to the maneuver on the console 900.

In an embodiment, the control unit 850 of the vehicle display apparatus 800 may generate the first drive signal for driving the display unit 820 of the vehicle display apparatus 800 from the driver's seat to the front passenger seat, based on direction information corresponding to the first tilting direction, which is included in the first signal in response to the first maneuver on the console 900. That is, as described above with reference to FIG. 15C, the vehicle display apparatus 800 may be controlled to move toward the front passenger seat based on the first tilting signal generated from the console 900.

In addition, in an embodiment, the control unit 850 of the vehicle display apparatus 800 may generate the first drive signal for driving the display unit 820 of the vehicle display apparatus 800 from the front passenger seat to the driver's seat, based on direction information corresponding to the second tilting direction, which is included in the first signal in response to the first maneuver on the console 900. That is, as described above with reference to FIG. 15D, the vehicle display apparatus 800 may be controlled to move toward the driver's seat (or the center) based on the second tilting signal generated from the console 900.

In an embodiment, the control unit 850 of the vehicle display apparatus 800 may generate the second drive signal for ejecting the display unit 820 of the vehicle display apparatus 800 outward from the internal space of the frame 802, based on direction information corresponding to the third tilting direction, which is included in the second signal in response to the second maneuver on the console 900. That is, as described above with reference to FIG. 15A, the vehicle display apparatus 800 may be controlled to gradually move to be exposed outward from the internal space of the frame 802 based on a third tilting signal generated from the console 900.

In addition, in an embodiment, the control unit 850 of the vehicle display apparatus 800 may generate the second drive signal for gradually retracting the display unit 820 of the vehicle display apparatus 800 into the internal space of the frame 802, based on direction information corresponding to the fourth tilting direction, which is included in the second signal in response to the second maneuver on the console 900. That is, as described above with reference to FIG. 15B, the vehicle display apparatus 800 may be controlled to gradually move to be retracted into the internal space of the frame 802 based on the fourth tilting signal generated from the console 900.

Figure 16:
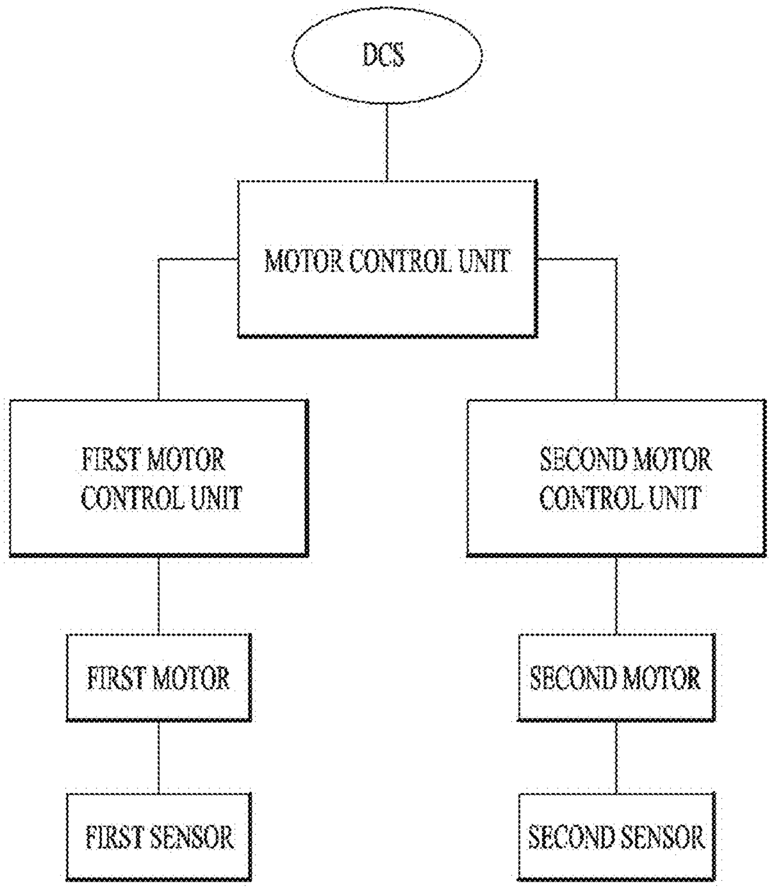
FIG. 16 is a block diagram illustrating a detailed configuration of a plurality of drive modules for moving the vehicle display apparatus according to the embodiment of the present disclosure.

FIG. 16 is a view that is referenced to describe motor control associated with the movement of the vehicle display apparatus 800 according to the embodiments that are described above with reference to FIGS. 15A to 15D.

In FIG. 16, a DCS may be a server for communication to enable the vehicle display apparatus 800 to operate in conjunction with other devices within the vehicle 100. The DCS provides communication such that the vehicle 100 and the vehicle display apparatus 800 operate in conjunction or that the vehicle display apparatus 800 operates in conjunction with another vehicle display apparatus 800 for the rear seat within the vehicle.

In FIG. 16, the motor control unit can control the operation of each of the plurality of drive units 830 to move the vehicle display apparatus 800 in different directions. In addition, the term "motor control unit" in FIG. 8 may be used in the same sense as the control unit 850 of the vehicle display apparatus 800.

In FIG. 16, a first motor control unit may control the operation of the first drive module 830*a* of each of the plurality of drive units 830. In addition, the first motor control unit may control a first motor that operates in conjunction with the first drive module 830*a*. In an embodiment, the first drive module 830*a* may be understood to include the first motor that operates in conjunction with the first drive module 830*a*, and a first motor control unit (or a first motor controller) for controlling the first motor.

In FIG. 16, a second motor control unit may control the operation of the second drive module 830*b* among the plurality of drive units 830. Additionally, the second motor controller may control a second motor that operates in conjunction with the second drive module 830*b*. In an embodiment, the second drive module 830*b* may be understood to include the second motor that operates in conjunction with the second drive module 830*b*, and a second motor control unit (or a first motor controller) for controlling the second motor.

In addition, a first sensor in FIG. 16 may detect the operation of the first motor and/or the distance traveled by the vehicle display apparatus 800 in the transverse direction in response to the operation of the first motor. In addition, a second sensor may detect the operation of the second motor and the distance by which the vehicle display apparatus 800 moves in the longitudinal direction in response to the operation of the first motor.

A signal, resulting from the first maneuver and/or the second maneuver on the console 900, may include the extent of distance of the display unit 820, that is, movement distance information, the distance of distance being dependent on the tilt extent of each maneuver on the console 900.

At this point, the tilt extent of each maneuver may include at least one of the following: the strength (angle and pressure), the extent of movement, or the holding time, either of which is associated with the tilting applied to the maneuver unit 910 of the console 900.

In addition, the movement distance information refers to the extent of movement of the vehicle display apparatus 800 that corresponds to each drive signal. For example, the movement distance information may include the distance by which the vehicle display apparatus 800 moves in the transverse direction in response to the first drive signal. In addition, the movement distance information may include the distance by which the vehicle display apparatus 800 moves in the longitudinal direction in response to the second drive signal.

The control unit 850 of the vehicle display apparatus 800 may determine the driving distance of the drive module 830*a* or 830*b* corresponding to the first drive signal or the second drive signal based on distance information included in the signal (e.g., one of the first to fourth tilting signals) received from the console 900. Based on the determined driving distance of the drive module 830*a* or 830*b*, the travel distance (the degree of movement) of the display unit 820 varies.

In an embodiment, the control unit 850 of the vehicle display apparatus 800 may generate the first drive signal for moving the display unit 820 of the vehicle display apparatus 800 by a first distance in the transverse direction based on distance information corresponding to the first tilting degree, which is included in the first signal from the console 900. In this case, the vehicle display apparatus 800 may detect through the first sensor that the display unit 820 moves by the first distance.

In addition, in an embodiment, the control unit 850 of the vehicle display apparatus 800 may generate the first drive signal for moving the display unit 820 of the vehicle display apparatus 800 by a second distance, different from the first distance, in the transverse direction based on distance information corresponding to the second tilting degree, which is included in the first signal from the console 900. In this case, the vehicle display apparatus 800 may detect through the first sensor that the display unit 820 moves by the second distance.

In addition, in an embodiment, the control unit 850 of the vehicle display apparatus 800 may generate the second drive signal for retracting the display unit 820 of the vehicle display apparatus 800 in the longitudinal direction by a first size into the internal space of the frame 802 or ejecting the display unit 820 in the longitudinal direction by the first size therefrom, based on distance information corresponding to the first tilting degree, which is included in the second signal from the console 900. In this case, the vehicle display apparatus 800 may detect through the second sensor that the display unit 820 moves by the first distance.

In addition, in an embodiment, the control unit 850 of the vehicle display apparatus 800 may generate the second drive signal for retracting the display unit 820 of the vehicle display apparatus 800 by a second size, different from the first size, into the internal space of the frame 802 or ejecting the display unit 820 by the second size from the internal space, based on direction information corresponding to the second tilting degree, which is included in the second signal from the console 900. In this case, the vehicle display apparatus 800 may detect through the second sensor that the display unit 820 moves by the second distance.

In an embodiment, the motor control unit may control the first motor control unit and the second control unit to operate independently of each other.

The motor control unit operates such that the first motor control unit drives the first motor based on the first drive signal. In addition, the motor control unit operates such that the second motor control unit drives the second motor based on the second drive signal.

When the first drive signal and the second drive signal are received simultaneously, the vehicle display apparatus 800 may process a plurality of signals according to a preset reference.

In an embodiment, based on the points in time when the drive signals for the first drive module and the second drive module are received, the control unit 850 of the vehicle display apparatus 800 may operate such that the drive modules operate sequentially, one after another.

For example, in a case where the first drive signal and the second drive signal are received sequentially, the vehicle display apparatus 800 may first move in the transverse direction in response to the first drive signal, and then move in the longitudinal direction in response to the second drive signal. At this point, the term 'subsequently' in the expression 'an operation is subsequently performed' refers to a case where the movement in the second direction starts immediately after movement in the first direction is completed or a case where the movement in the second direction starts within a predetermined time (i.e., 0.5 seconds) after the movement in the first direction is completed.

In another embodiment, the control unit 850 of the vehicle display apparatus 800 controls each of the plurality of drive modules to operate based on a point in time when the drive signal is received, and when it is determined that a plurality of drive signals, that is, the first and second drive signals, are received simultaneously, it may control the drive modules to operate according to a set priority.

For example, when it is determined that the first and second drive signals are received simultaneously, the drive modules may operate such that a movement operation corresponding to a preset specific direction is first performed. As a specific example, the priority of the movement direction of the vehicle display apparatus 800 may be set as follows: the direction in which the vehicle display apparatus 800 is ejected outward from the internal space of the frame (first priority), the direction in which the vehicle display apparatus 800 moves between the driver's seat and the front passenger seat (second priority), and the direction in which the vehicle display apparatus 800 is retracted into the internal space of the frame (third priority). In this case, when it is determined that the plurality of drive signals is received, the drive modules may operate sequentially to match the priority of preset movement directions.

In another embodiment, the control unit 850 of the vehicle display apparatus 800 may control the drive modules, corresponding to the first and second drive signals, to operate simultaneously based on the determination that the first and second drive signals are received simultaneously.

For example, with reference to FIG. 16, the motor control unit may control both the first and second motor control units to operate simultaneously based on the simultaneous reception of the first and second drive signals. In this case, for example, the vehicle display apparatus 800 may move in the transverse direction and simultaneously ejected from or retracted into the frame 802.

Figure 17A:
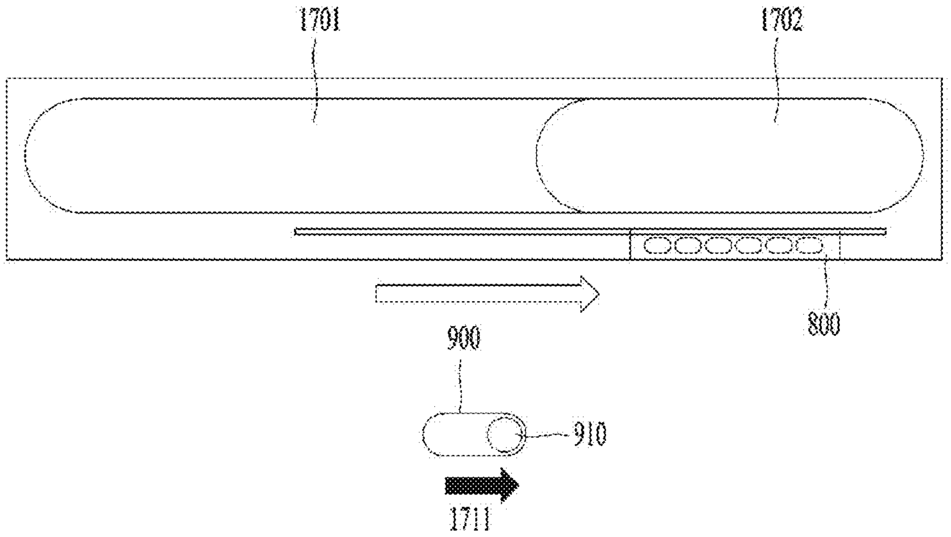
FIGS. 17A and 17B are illustrative views that are referenced to describe the movement of the vehicle display apparatus for generating a screen for the front passenger seat and a method of performing a maneuver on a console.
Figure 17B:
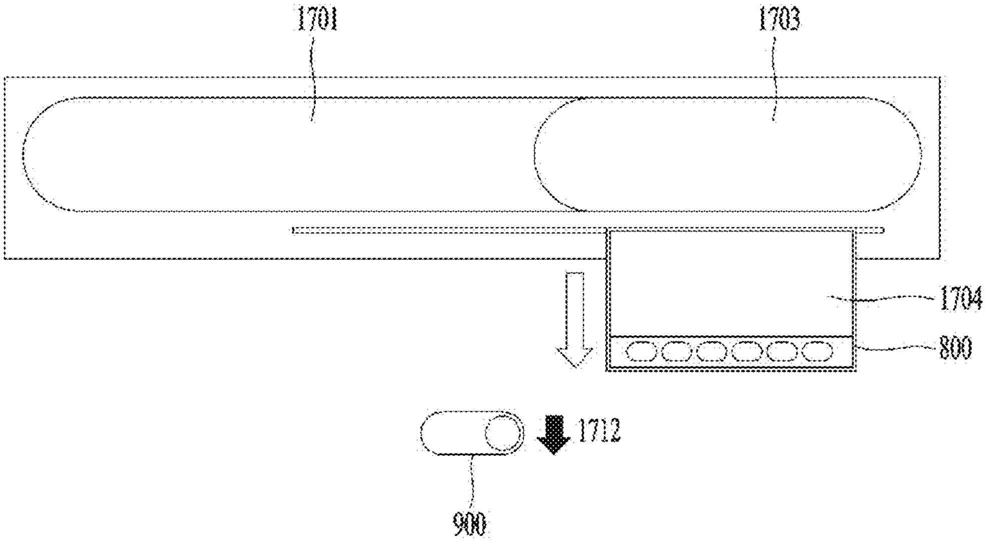

With reference to FIGS. 17A and 17B, a method of performing a maneuver on the console 900, which is associated with the movement of the vehicle display apparatus 800 for generating a screen for the front passenger seat, is described in detail.

First, with reference to FIG. 17A, the first tilting signal for operating the first drive module 830*a* of the vehicle display apparatus 800 is generated based on a maneuver 1711, which involves moving the maneuver unit 910 of the console 900 from left to right. The generated first tilting signal is transferred to the control unit 850 of the vehicle display apparatus 800 to operate the first drive module 830*a*.

In response to the operation of the first drive module 830*a*, the vehicle display apparatus 800 moves from the driver's seat (or the center) to the position corresponding to the front passenger seat. At this point, in a state where the vehicle display apparatus 800 is retracted into the internal space of the frame, a screen on the first display 825 does not yet switch to the split-screen mode, and only a region 1702 for the occupant in the front passenger seat is generated. At this point, screen control is not performed independently on the region 1702.

Subsequently, with reference to FIG. 17B, the third tilting signal for operating the second drive module 830*b* of the vehicle display apparatus 800 is generated based on a maneuver 1712, which involves moving the maneuver unit 910 of the console 900 downward. The generated third tilting signal is transferred to the control unit 850 of the vehicle display apparatus 800, thereby operating the second drive module 830*b*.

In response to the operation of the second drive module 830*b*, the vehicle display apparatus 800 is ejected outward from the internal space of the frame. Accordingly, a screen on the first display 825 is now split into a first screen 1701 for the driver and a second screen 1703 for the occupant in the front passenger seat, and the first screen 1701 and the second screen 1703 are displayed. The first screen 1701 and the second screen 1703, which result from this division, are controlled independently.

In another embodiment, when a predetermined time elapses after the vehicle display apparatus 800 moves from the driver's seat (or the center) to the position corresponding to the front passenger seat, as illustrated in FIG. 17B, a control signal for operating the second drive module 830*b* may be automatically generated without an additional maneuver on the console 900. Accordingly, the screen on the first display 825 may be split into the first screen 1701 and the second screen 1703, and the first screen 1701 and the second 1703 may be controlled independently of each other.

Various embodiments are described below in which the vehicle display apparatus 800 moves according to preset conditions and in which, based on the movement of the vehicle display apparatus 800, screens on the first and second displays change.

Figure 18:
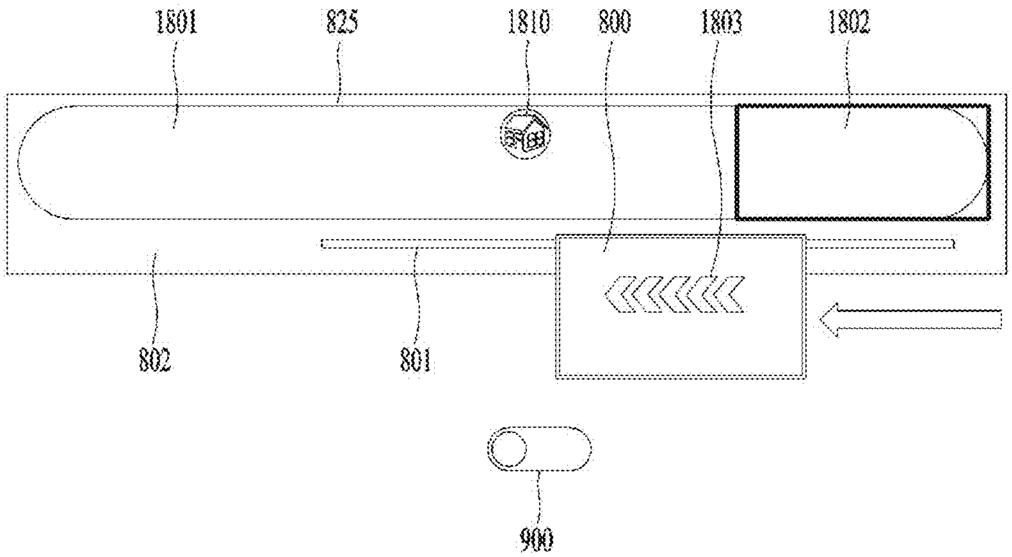
FIG. 18 is a view that is referenced to describe the movement of the vehicle display apparatus when a vehicle according to the present disclosure reaches a destination and an example of a method of displaying screens on the first and second displays.

FIG. 18 is an illustrative view illustrating the movement of the vehicle display apparatus 800 when the vehicle reaches the destination thereof and a method of displaying screens on the first and second displays.

According to an embodiment, the control unit 850 of the vehicle display apparatus 800 may receive vehicle navigation information and recognize that the vehicle 100 reaches the destination thereof based on the received vehicle navigation information.

In this manner, based on the vehicle 100 reaching the destination, the vehicle display apparatus 800 may control the operations of the plurality of drive units 830 such that the display unit 820, that is, the second display, moves to an initial position thereof corresponding to the driver's seat (or the center) within the vehicle. At this point, the vehicle reaching its destination may mean that, according to guidance derived from navigation information, the vehicle 100 moves slowly or stops after reaching its destination. At this point, a graphic object 1810 indicating arrival at the destination may be displayed on a first screen 1801 on the first display 825.

When the vehicle reaches the destination thereof, the vehicle display apparatus 800 may be controlled to return to the original position thereof and to enable the screen on the first display 825 to switch to the full-screen mode. Specifically, the first and second drive modules 830*a* and 830*b* operate such that the second display of the vehicle display apparatus 800 moves along the slot 801 to the position corresponding to the driver's seat (or the center). Accordingly, a region of a second screen 1802, which is for the occupant in the front passenger seat, on the first display 825 disappears gradually. In other words, the first screen 1801 on the first display 825 gradually expands to cover the second screen 1802.

Upon arrival at the destination, the vehicle display apparatus 800 returns to the initial position thereof. At this point, the maneuver unit of the console 900 that operates in conjunction with the vehicle display apparatus 800 may also automatically move to the initial position thereof (e.g., in the leftward direction).

Subsequently, when the vehicle display apparatus 800 is retracted into the internal space of the frame 802 after moving to the position corresponding to the driver's seat (or the center), a screen on the first display 825 switches to the full-screen mode, and a parking mode screen for parking the vehicle 100 is displayed.

In another embodiment, when the vehicle 100 reaches the destination, a message notifying arrival at the destination and a message asking whether to continue viewing may also pop up on the split screen on the second display 822. In this case, based on selective input from the occupant in the front passenger seat, the split screen may remain displayed. Alternatively, after or at the same time the vehicle display apparatus 800 moves to the initial position thereof, screen integration may be performed on the second display 822.

Figure 19:
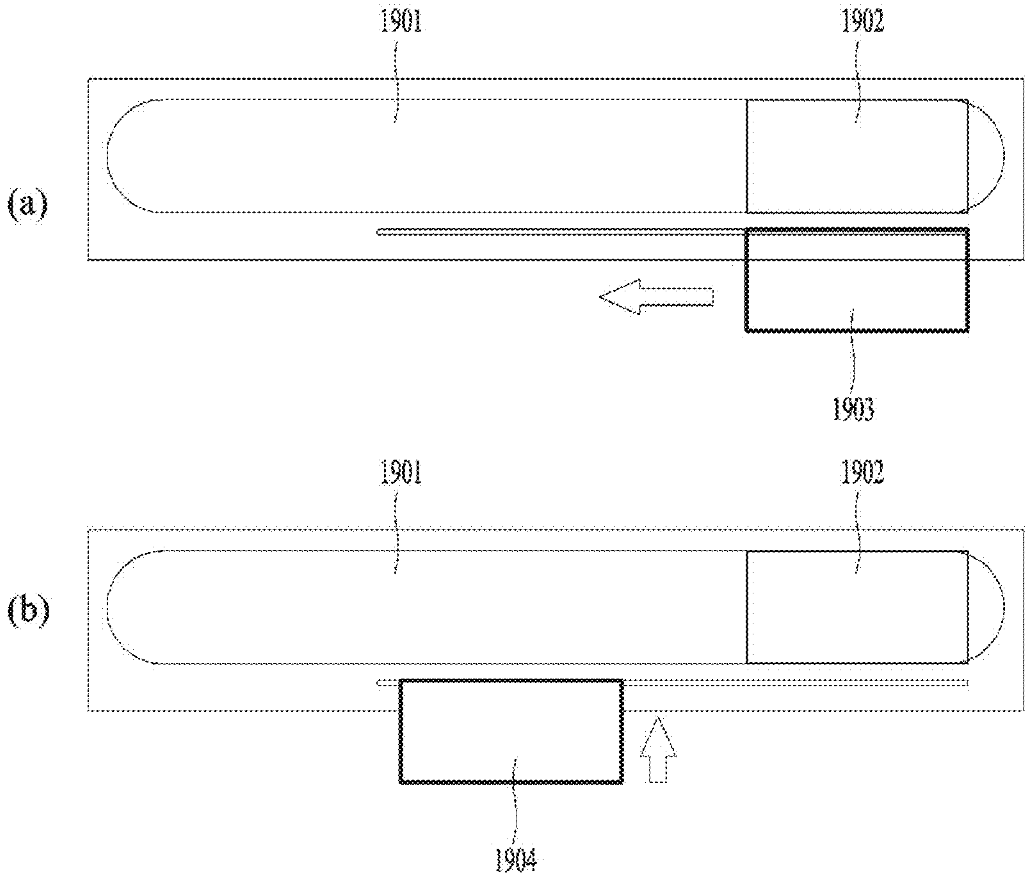
FIG. 19 is a view that is referenced to describe a method of performing the operation of restricting the movement of the vehicle display apparatus based on state information of the vehicle according to the embodiment of the present disclosure.

Subsequently, FIG. 19 is a view that is referenced to describe a method of performing the operation of restricting the movement of the vehicle display apparatus 800 based on state information of the vehicle 100.

According to an embodiment, when activated, the vehicle display apparatus 800 may receive through a receiver (not illustrated) the state information, which is obtained by sensing through the sensor of the vehicle 100 while the vehicle travels. Then, the control unit 825 of the vehicle display apparatus 800 may restrict the operations of the plurality of drive units 830 based on the received vehicle state information.

At this point, the vehicle state information, which is used to restrict the operations of the plurality of drive units 830, include various types of sensing information corresponding to the occurrence of situations in which the driver of the vehicle 100 needs to focus on driving. For example, the situations in which the driver is required to safely drive the vehicle 100 may be detected, such as switching of traveling mode of the vehicle 100 (from an autonomous traveling mode to a manual traveling mode), hazardous/emergency conditions in the vicinity of the vehicle, and the vehicle 100 entering a parking mode.

In addition, in this context, the restriction on the operations of the plurality of drive units 830 by the control unit 850 refers to the operation of maintaining the vehicle display apparatus 800 in a predetermined state regardless of user inputs associated with the operations of the plurality of drive units 830. Therefore, the restriction on the plurality of drive units 830 does not mean restricting the operations of the first and second drive modules 830*a* and 830*b*. This state of the vehicle display apparatus 800 may indicate the presence of a driving restriction based on the vehicle state information.

Subsequently, when a preset restriction condition is determined to be satisfied according to the received state information, the control unit 850 of the vehicle display apparatus 800 may control the operations of the plurality of drive units 830 such that the display unit 820, that is, the second display, remains in the initial position and state thereof. Accordingly, the display unit 820 returns to the initial state thereof, in which the display unit 820 is retracted into the internal space of the frame 802 from the position corresponding to the driver's seat (or the center) within the vehicle.

For example, when the driving restriction occurs based on the vehicle state information, as illustrated in (a) of FIG. 19, the vehicle display apparatus 800 positioned to correspond to the front passenger seat starts to move to the initial position thereof corresponding to the driver's seat (or the center). To this end, the first drive module 830*a* provides a driving force to move the vehicle display apparatus 800 in the leftward direction.

Then, as illustrated in (b) of FIG. 19, the vehicle display apparatus 800 positioned in the driver's seat (or the center) moves to be retracted into the internal space of the frame 802 through the slot 801 formed on the frame. To this end, the second drive module 830*b* provides a driving force to move the vehicle display apparatus 800 upward.

In this manner, when a predetermined time elapses after the vehicle display apparatus 800 returns to the initial position and state thereof, the vehicle display apparatus 800 may control the first display 825 such that a first screen 1901 thereof expands to cover a display region of a second screen 1902 for the occupant in the front passenger seat and is displayed.

While the vehicle display apparatus 800 is at the position corresponding to the front passenger seat as illustrated in (a) of FIG. 19, a control/execution screen 1903 associated with the second screen 1902 for the occupant in the front passenger seat is output on the display unit 820.

As illustrated in (b) of FIG. 19, when the vehicle display apparatus 800 moves to the position corresponding to the driver's seat (or the center), a control/execution screen 1904 associated with the first screen 1901 for the driver may now be output on the display unit 820.

The vehicle display apparatus 800 may operate to cancel the restriction on the operations of the plurality of drive units 830 based on the received vehicle state information. In this case, in response to the received signal for canceling the operation restriction, the vehicle display apparatus 800 may control the operations of the plurality of drive units 830 such that the vehicle display apparatus 800 return to the position and state held immediately prior to the operation restriction.

Specifically, the control unit 850 of the vehicle display apparatus 800 may recognize that the preset restriction cancellation condition is satisfied based on the state information received from the vehicle 100 and cancel the restriction on the operations of the plurality of drive units 830. Accordingly, the control unit 850 may operate the first and second drive modules 830*a* and 830*b* such that the second display, that is, the display unit 820, returns to the position held prior to the satisfaction of the preset restriction condition.

At this point, when the display unit 820 returns to the position corresponding to the front passenger seat, the recently displayed second screen for the occupant in the front passenger seat may be re-displayed on the first display 825. In addition, the control screen/execution screen associated with the second screen may be re-output on the moved display unit 820.

Another example of a restriction on the operation of the vehicle display apparatus 800 may be an update of a system within the vehicle 100 system. However, in this case, it is assumed that the update of the system within the vehicle 100 maintains the vehicle display apparatus 800 in the initial position and state thereof.

Figure 20A:
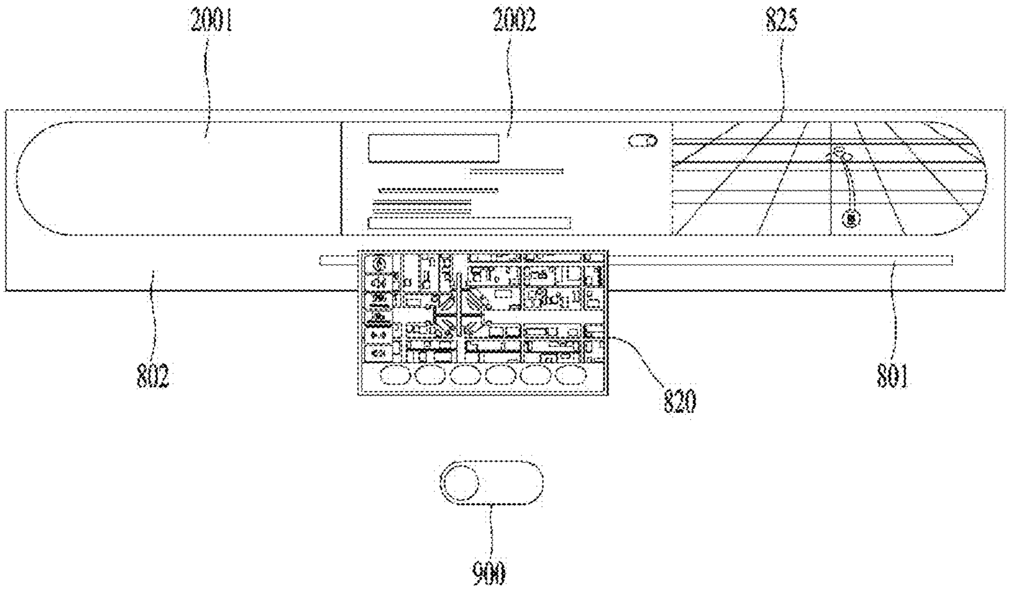
FIGS. 20A and 20B are views that are referenced to describe a method of operating the vehicle display apparatus during an update of a system within the vehicle, according to an embodiment of the present disclosure.
Figure 20B:
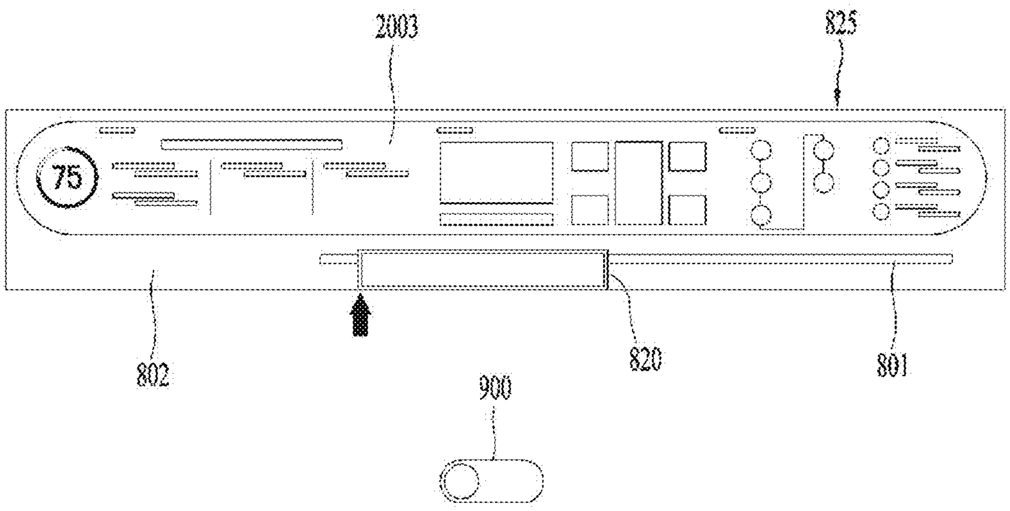

FIGS. 20A and 20B are views that are referenced to describe a method of operating the vehicle display apparatus 800 during the update of the system within the vehicle, according to an embodiment of the present disclosure.

In an embodiment, if the update of the system within the vehicle 100 is requested, as described above with reference to FIG. 19, the vehicle display apparatus 800 controls the operations of the plurality of drive units 830 such that the vehicle display apparatus 800 returns to the initial position and state thereof. At this point, the system within the vehicle refers to a software (SW) update of various components of the vehicle.

First, with reference to FIG. 20A, the update of the system within the vehicle is not performed while the display unit 820 of the vehicle display apparatus 800 is exposed outward from the frame 802 at the position corresponding to the driver's seat (or the center).

At this point, a cluster region and the first screen for the driver are displayed on the first display 825. Specifically, the cluster region including information associated with a traveling state of the vehicle is displayed on a left-side region 2001 of the first display 825, and a navigation screen for the driver is displayed as the first screen on the remaining region 2002.

In this case, an execution screen that is the same as or similar to the navigation screen for the driver may be displayed on the display unit 820, that is, the second display.

Subsequently, in a case where the vehicle is not in a traveling state and where a user input is provided or a preset condition (e.g., a preset time or the like) is satisfied, the update of the system within the vehicle may be requested. The vehicle display apparatus 800 receives the request for the update of the system and controls the operations of the plurality of drive units 830 such that the vehicle display apparatus 800 maintains the initial position and state thereof.

Specifically, as illustrated in FIG. 20B, the operation of retracting the display unit 820 into the internal space of the frame 802 through the slot 801 formed on the frame 802 is performed by operating the second drive module 830*b*. Then, a screen on the first display 825 switches to the full-screen mode, and the update of the system update is performed. At this point, an execution screen 2003 for the update of the system update may be displayed on the first display 825.

Figure 21:
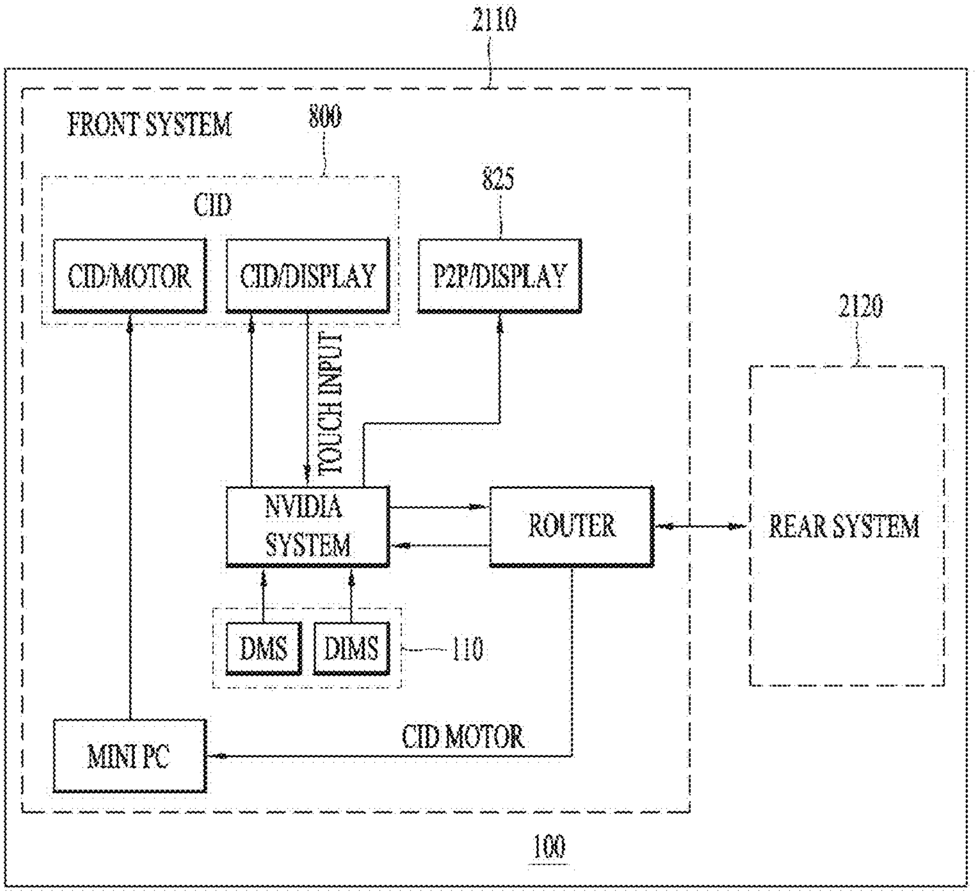
FIG. 21 is an illustrative block diagram that is referenced to describe the operation of the vehicle display apparatus according to the embodiment of the present disclosure in conjunction with a display apparatus for a rear seat within the vehicle.

FIG. 21 is an illustrative block diagram that is referenced to describe the operation of the vehicle display apparatus 800 in conjunction with a display apparatus for the rear seat within the vehicle.

The vehicle display apparatus 800 according to the embodiment of the present disclosure may either constitute a part of a front-seat display system 2110 positioned in front of the front seat within the vehicle 100 or serve as the front-seat display system 2110 itself. In this case, the front-seat display system 2110 may operate in c conjunction with a rear-seat display apparatus/system 2120 positioned near the rear seat within the vehicle 100.

To this end, as illustrated in FIG. 21, a front-seat display system 2110 may be configured to include the vehicle display apparatus 800, the first display 825, a control board system (NVIDIA SYSTEM), a monitoring system 110, a mini PC, and a router.

At this point, the vehicle display apparatus 800 may be configured to include a display unit, that is, a CID, and a motor that provides a driving force for operating the CID.

The control board system (NVIDIA SYSTEM) may, for example, control the first display unit 825, that is, a P2P screen, based on a touch input to the CID of the vehicle display apparatus 800.

In addition, the control board system (NVIDIA SYSTEM) may control the operation of the vehicle display apparatus 800 and the screen on the first display 825 based on operational results from the monitoring system 110 of the vehicle, for example, operational results from a DMS and a DIMS.

The front-seat display system 2110 may communicate with the rear-seat display system 2120 of the vehicle 100 through the router. The front-seat display system 2110 may control the operation of the vehicle display apparatus 800 of the front-seat display system 2110 based on an operational state of the rear-seat display system 2120.

For example, when the operational state of the rear-seat display system 2120 is received by the front-seat display system 2110 through the router, the mini PC is involved in operating a CID motor of the vehicle display apparatus 800, that is, the plurality of drive units 830. Specifically, based on a drive signal generated by the mini PC, the CID motor operates in synchronization with the rear-seat display system 2120.

Conversely, for example, the operational states of the vehicle display apparatus 800 or the front-seat display system 2110 may also be transferred to the rear-seat display system 2120 through the router. In this case, the rear-seat display system 2120 may be driven, or driven in a restricted manner, to operate in synchronization with the front-seat display system 2110.

As described above, with the vehicle display apparatus according to the embodiment of the present disclosure and the method of operating the vehicle display apparatus, a screen on the front-seat large-sized display can change adaptively based on a change in the position of the vehicle display apparatus configured to be movable. Accordingly, both the driver and the occupant in the front passenger seat can independently view and control the screen. In addition, different screens corresponding to the current position of the vehicle display apparatus can be output, thereby enabling a screen on a large-sized display to be easily controlled without changing the seated posture of the driver or the occupant in the front passenger seat. Moreover, the movement of the vehicle display apparatus can be intuitively controlled by performing a maneuver on the console that operates in conjunction with the vehicle display apparatus, thereby providing a convenient user experience that enables a change in the display mode of the screen on the front-seat large-sized display. In addition, in a case where a restriction is required based on the traveling state of the vehicle, the vehicle display apparatus can be restored to the initial position and state thereof, and the screen on the front-seat large-sized display adapts accordingly. Therefore, both the convenient use of the display and the safe driving can be simultaneously achieved.

The present disclosure can be embodied in the form of computer-readable code on a program-recorded medium. The computer-readable media include all types of recording devices in which to store data that are readable by a computer system. Furthermore, examples of the computer-readable medium include a hard disk drive (HDD), a solid-state disk (SSD), a silicon disk drive (SDD), a ROM, a RAM, a CD-ROM, a magnetic tape, a floppy disk, an optical data storage device, and similar storage devices. The computer-readable medium may also be realized in the form of a carrier wave (such as for transmission over the Internet). In addition, the computer may also include a controller/processor of the vehicle display apparatus 800. Therefore, the description detailed above should be regarded as exemplary, without being interpreted as limiting in any respect. The scope of the present disclosure should be determined by the proper construction of the following claims. All equivalent modifications to the embodiments of the present disclosure fall within the scope of the present disclosure.

The invention claimed is:

1. A vehicle display apparatus comprising:

a first display unit that is arranged within a frame formed to correspond to a driver's seat and a front passenger seat within a vehicle, and installed in a rectangular shape to correspond to the driver's seat and the front passenger seat;

a second display unit that is coupled to one side of the frame, and configured to move between the driver's seat and the front passenger seat along a transverse direction of the frame in response to an operation of a drive module and to perform screen control on the first display unit in response to the movement; and a control unit that controls respective operations of the first display unit, the second display unit, and the drive module, wherein the control unit displays a first screen on the first display unit, and based on the movement of the second display unit to a position corresponding to the front passenger seat, controls the first display unit such that a second screen for the front passenger seat is assigned to a position corresponding to the front passenger seat of the first display unit.

2. The vehicle display apparatus of claim 1, wherein the second screen is displayed on one region of the first display unit, which corresponds to the front passenger seat, and the first screen is displayed on at least one of remaining regions of the first display unit, and wherein the control unit displays a control screen for the second screen on the second display unit based on the assignment of the second screen for the front passenger seat to the first display unit.

3. The vehicle display apparatus of claim 2, wherein, in a state where the control screen for the second screen is displayed on the second display unit, based on an input to the second display unit, the control unit controls the first display unit such that the first screen remains displayed and that only the second screen is changed.

4. The vehicle display apparatus of claim 2, wherein in a state where the second screen is displayed on the first display unit, based on the movement of the second display unit to a position corresponding to the driver's seat, the control unit controls the first display unit such that the first screen expands to cover the one region and is displayed.

5. The vehicle display apparatus of claim 4, wherein, based on the movement of the second display unit to the position corresponding to the driver's seat and on the expansion of the first screen to cover the one region and the display of the first screen, the control unit changes a screen on the second display unit to a control screen for the expanded first screen.

6. The vehicle display apparatus of claim 1, wherein the drive module comprises:

a first drive module that is coupled to the second display unit, and, in response to a control signal from the control unit, operates to move the second display unit along the transverse direction of the frame; and a second drive module that operates to retract or eject at least one portion of the second display unit into or outward from an internal space of the frame, and wherein the control unit displays the second screen for the front passenger seat based on the movement of the second display unit to the position corresponding to the front passenger seat in response to the operation of the first drive module.

7. The vehicle display apparatus of claim 6, wherein, in a state where the at least one portion of the second display unit is ejected outward from the internal space of the frame in response to the operation of the second drive module, based on the movement of the second display unit to the position corresponding to the front passenger seat in response to the operation of the first drive module, the control unit generates the second screen for the front passenger seat and displays a control screen for the second screen on the second display unit.

8. The vehicle display apparatus of claim 6, wherein, in a state where the second display unit is retracted into the internal space of the frame in response to the operation of the second drive module, based on the movement of the second display unit to the position corresponding to the front passenger seat in response to the operation of the first drive module, the control unit generates the second screen for the front passenger seat and displays visual information for providing guidance for the operation of the second drive module on the second screen such that the second display unit is ejected outward from the frame.

9. The vehicle display apparatus of claim 6, wherein, in a state where the second screen is displayed on the first display unit, based on the movement of the second display unit to a position corresponding to the driver's seat in response to the operation of the first drive module and on the retraction of the at least one portion of the first display unit into the frame in response to the operation of the second drive module, the control unit controls the first display unit such that the first screen expands to cover a display region of the second screen.

10. The vehicle display apparatus of claim 6, wherein, in a state where the second screen is displayed on the first display unit and where that at least one portion of the second display unit is ejected outward from the frame, based on the movement of the second display unit to a position corresponding to the driver's seat in response to the operation of the first drive module, the control unit controls the first display unit such that the first screen extends to cover a display area of the second screen, and displays a control screen for the first screen on the second display unit.

11. The vehicle display apparatus of claim 10, wherein, while the second display unit moves to the position corresponding to the front passenger seat, the control unit displays visual information indicating a movement direction on the second display unit, and, at a point in time when the second display unit stops at the position corresponding to the front passenger seat, displays a control screen for the second screen on the second display unit.

12. The vehicle display apparatus of claim 1, wherein, based on reception of vehicle navigation information and the arrival of vehicle at a destination thereof, the control unit controls the operation of the drive module such that the second display unit moves to a position corresponding to the driver's seat and controls the first display unit such that the first screen expands to cover a display region of the second screen.

13. The vehicle display apparatus of claim 1, further comprising:

a reception unit that receives state information that is obtained by sensing while the vehicle travels, wherein the control unit restricts the operation of the drive module based on the received state information, wherein, when a preset restriction condition is satisfied, the control unit operates the drive module such that the second display unit returns to a position corresponding to the driver's seat, and wherein, when a predetermined time elapses after returning to the position, the control unit expands the first screen to cover a display region of the second screen and displays the first screen.

14. The vehicle display apparatus of claim 13, wherein, based on satisfaction of a restriction cancellation condition preset based on the received state information, the control unit cancels a restriction on the operation of the drive module and operates the drive module such that the second display unit returns to a position held prior to the satisfaction of the preset restriction condition, and wherein, when the second display unit returns to the position corresponding to the front passenger seat, the control unit displays a recently displayed second screen to the first display unit.

15. The vehicle display apparatus of claim 1, wherein the first screen is an execution screen of a navigation application, and the second screen is one of a navigation execution screen, an execution screen of a recently executed application, or an execution of a user-preset application, each of which is different from the first screen.

* * * * *